(12) United States Patent
Hulse

(10) Patent No.: US 6,168,302 B1
(45) Date of Patent: Jan. 2, 2001

(54) HYBRID DISTRIBUTED LIGHTING SYSTEM FOR A VEHICLE

(75) Inventor: George R. Hulse, Cookeville, TN (US)

(73) Assignee: Cooper Automotive Products, Inc., Houston, TX (US)

( * ) Notice: Under 35 U.S.C. 154(b), the term of this patent shall be extended for 0 days.

(21) Appl. No.: 09/009,836

(22) Filed: Jan. 20, 1998

Related U.S. Application Data
(60) Provisional application No. 60/069,118, filed on Dec. 9, 1997.

(51) Int. Cl.$^7$ .................................................. F21V 9/00
(52) U.S. Cl. ......................... 362/511; 362/551; 362/509
(58) Field of Search ........................... 362/20, 62, 72, 362/83.3, 254, 454, 551, 512, 507, 511, 496, 487–495, 459; 385/115, 43, 31, 124; 359/694, 696

(56) References Cited

U.S. PATENT DOCUMENTS

Re. 33,722   10/1991   Scifres et al. .
Re. 34,318    7/1993   Davenport et al. ................... 362/511

(List continued on next page.)

OTHER PUBLICATIONS

Stuart Birch, "Lighter Moments", Mar. 1997, Automotive Engineering

James Braham, "Bosch Lights Up: One Bulb, One Reflector, Two Beams", Dec. 12, 1996, Machine Design.

Henning Hogrefe et al., "Improving Safety Through Adaptive Forward Lighting", Oct. 1997, Automotive Engineering.

Valeo, Baroptic®: A New Styling Concept, 1997.

Michael A. Marinelli et al., "Diode Lasers Light the Way for Automotive Signal Lamps", Nov. 1997, Photonics.

George R. Hulse, "Focus–less Optics and their use in Automotive Distributed Lighting Systems", No. 970252.

George R. Hulse et al., "Analysis of Waveguide Geometries at Bends and Branches for the Directing of Light", No. 98?????.

George R. Hulse, et al., "Three Specific Design Issues Associated with Automotive Distributed Lighting Systems: Size, Efficiency, and Reliability", SAE Technical Paper Series, No. 960492.

George R. Hulse, et al., "HID Driven Focus–less Optics System for Complete Automotive Distributed Lighting Systems", No. 98 ?????.

*Primary Examiner*—Stephen Husar
*Assistant Examiner*—Ismael Negron
(74) *Attorney, Agent, or Firm*—Reising, Ethington, Barnes, Kisselle, Learman & McCulloch, P.C.

(57) ABSTRACT

A hybrid headlamp subsystem for use in a distributed lighting system in a vehicle includes a light source. A focuses light from the light source to provide forward illumination for the vehicle. A collector element receives from the light source for use in providing an additional lighting function. An optical waveguide has a end positioned to receive light from the collector element and a second end positioned to direct light for use in providing the additional lighting function.

18 Claims, 17 Drawing Sheets

U.S. PATENT DOCUMENTS

| | | | |
|---|---|---|---|
| 2,507,909 | 5/1950 | Kaysen . | |
| 3,683,167 | 8/1972 | Rishton | 362/581 |
| 3,832,028 * | 8/1974 | Kapron | 385/43 |
| 3,901,581 | 8/1975 | Thiel | 385/24 |
| 3,951,139 | 4/1976 | Kloots | 600/249 |
| 3,962,702 | 6/1976 | Kriege | 340/815.43 |
| 4,151,582 | 4/1979 | Grunberger | 362/31 |
| 4,222,091 | 9/1980 | Bartenbach | 362/565 |
| 4,428,029 | 1/1984 | Baliozian | 362/12 |
| 4,432,039 | 2/1984 | Cible | 362/31 |
| 4,755,918 | 7/1988 | Pristash et al. | 362/301 |
| 4,767,172 | 8/1988 | Nichols et al. | 385/146 |
| 4,824,194 | 4/1989 | Karasawa | 385/146 |
| 4,883,333 | 11/1989 | Yanez | 385/33 |
| 4,897,771 | 1/1990 | Parker | 362/298 |
| 4,945,457 | 7/1990 | Yazdani et al. . | |
| 5,042,892 | 8/1991 | Chiu et al. | 385/114 |
| 5,053,765 | 10/1991 | Sonehara et al. | 340/815.43 |
| 5,150,260 * | 9/1992 | Chigira | 359/694 |
| 5,178,446 * | 1/1993 | Gruber et al. | 362/20 |
| 5,193,894 | 3/1993 | Lietar et al. | 362/466 |
| 5,257,168 | 10/1993 | Davenport et al. | 362/556 |
| 5,311,410 | 5/1994 | Hsu et al. | 362/552 |
| 5,341,445 | 8/1994 | Davenport et al. | 385/39 |
| 5,343,367 | 8/1994 | Davenport et al. | 362/558 |
| 5,363,469 | 11/1994 | Elderfield | 385/146 |
| 5,436,805 | 7/1995 | Hsu et al. | 362/559 |
| 5,436,806 | 7/1995 | Kato | 362/511 |
| 5,446,628 * | 8/1995 | Blom et al. | 362/551 |
| 5,499,166 | 3/1996 | Kato et al. | 362/559 |
| 5,499,168 | 3/1996 | Cochard et al. | 362/466 |
| 5,560,699 | 10/1996 | Davenport et al. | 362/558 |
| 5,574,328 | 11/1996 | Okuchi | 313/114 |
| 5,584,558 | 12/1996 | Nath | 362/551 |
| 5,615,090 | 3/1997 | Kato | 362/560 |
| 5,624,176 | 4/1997 | O'Farrell et al. | 362/494 |
| 5,640,483 | 6/1997 | Lin | 385/146 |
| 5,664,863 | 9/1997 | Cassarly et al. | 362/583 |
| 5,669,699 | 9/1997 | Pastrick et al. | 362/494 |
| 5,675,677 | 10/1997 | Davenport et al. | 385/31 |
| 5,685,627 | 11/1997 | Kato | 362/551 |
| 5,692,823 | 12/1997 | Okuchi | 362/551 |
| 5,730,519 | 3/1998 | Okuchi et al. | 362/559 |
| 5,755,505 | 5/1998 | Hiramatsu | 362/581 |
| 5,791,756 | 8/1998 | Hulse et al. | 362/554 |
| 5,812,714 | 9/1998 | Hulse . | |

* cited by examiner

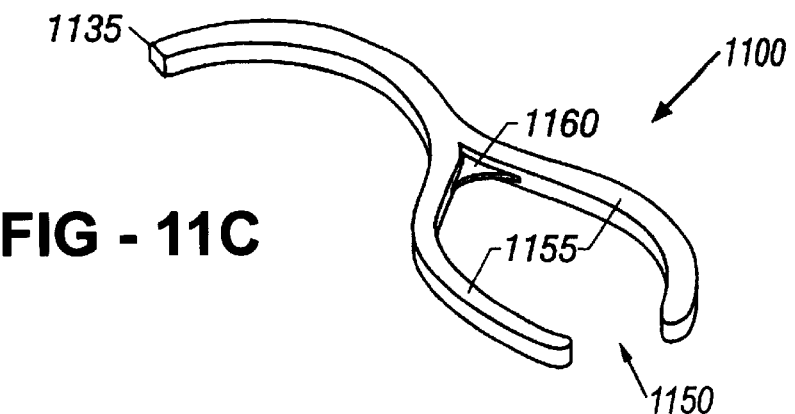
FIG - 11C
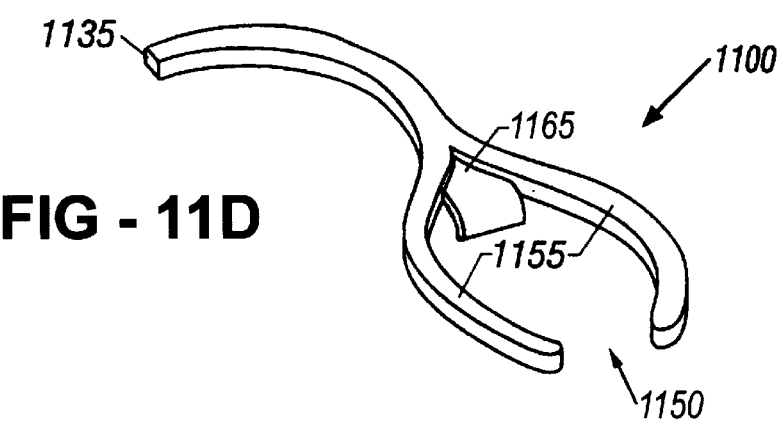
FIG - 11D
FIG - 11E
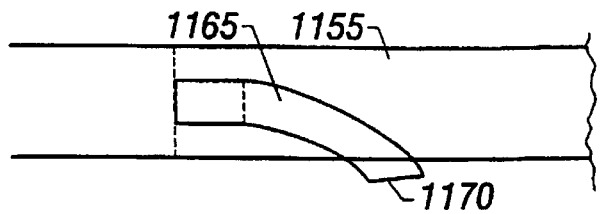

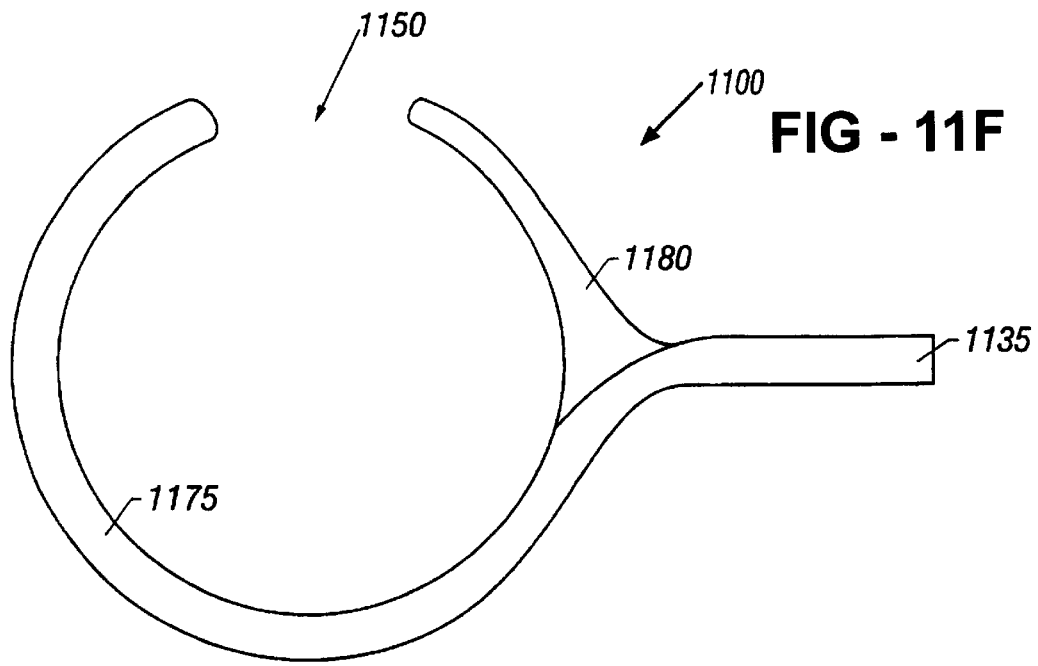
FIG - 11F
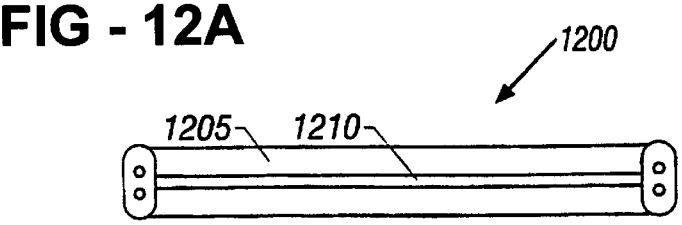
FIG - 12A
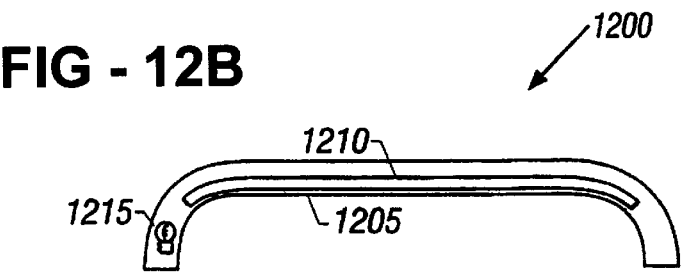
FIG - 12B
FIG - 12C
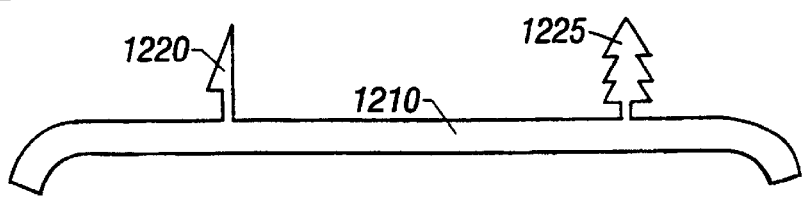

FIG - 15
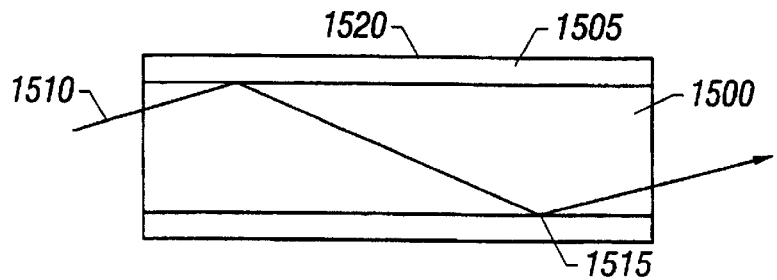
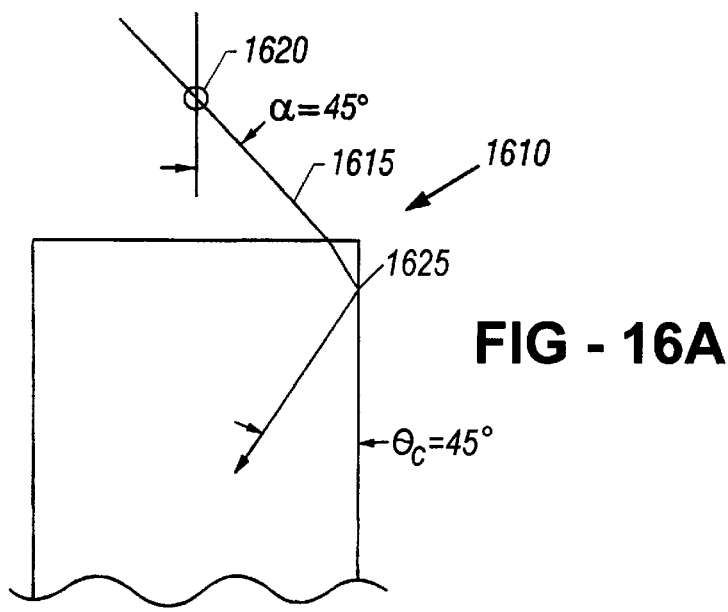
FIG - 16A
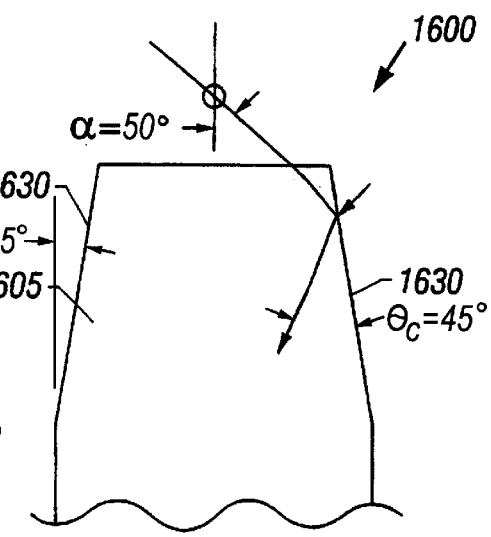
FIG - 16B

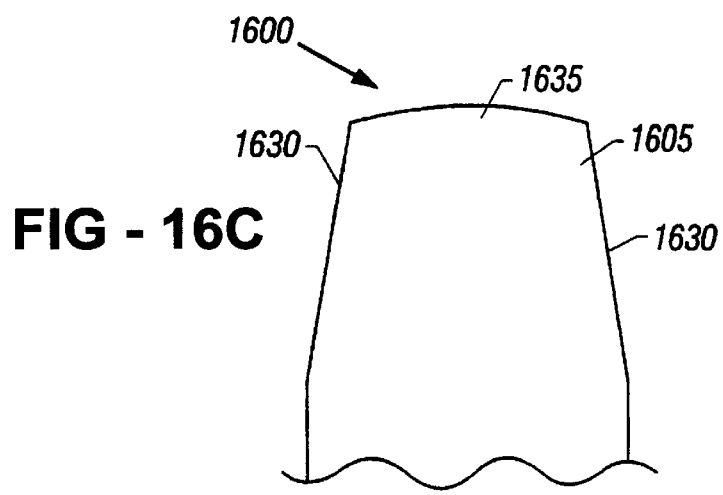
FIG - 16C
FIG - 17A
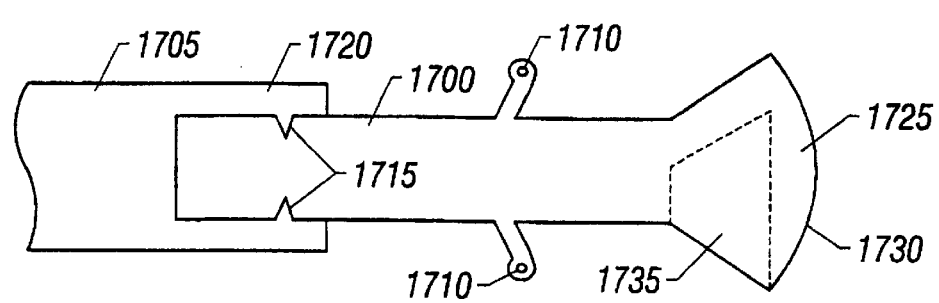
FIG - 17B
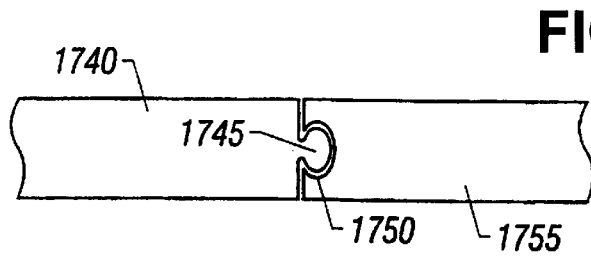
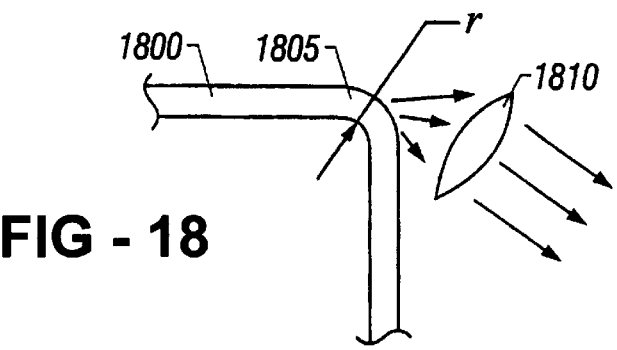
FIG - 18

HYBRID DISTRIBUTED LIGHTING SYSTEM FOR A VEHICLE

CROSS REFERENCE TO RELATED APPLICATIONS

This application claims priority from Provisional Application No. 60/069,118, filed Dec. 9, 1997 and entitled "HID DRIVEN FOCUS-LESS OPTICS SYSTEM", which is incorporated by reference.

BACKGROUND

The invention relates to distributed lighting systems.

Distributed lighting systems distribute light from one or more light sources in central locations to one or more remote locations. A distributed lighting system promises several advantages over conventional lighting techniques, including low power consumption, extended life, heat reduction where the light is emitted, and increased design flexibility.

SUMMARY

The invention provides a distributed lighting system (DLS) for use, for example, in an automobile. Issues associated with incorporating a distributed lighting system into an automobile are discussed by Hulse, Lane, and Woodward in "Three Specific Design Issues Associated with Automotive Distributed Lighting Systems: Size, Efficiency and Reliability," SAE Technical Paper Series, Paper No. 960492, which was presented at the SAE International Congress and Exposition, Detroit, Mich, Feb. 26–29, 1996, and is incorporated herein by reference.

A practical distributed lighting system for an automobile must address size, efficiency, and reliability issues. To this end, an implementation of the invention employs focus-less optics components, such as collector elements and waveguides. These components are inexpensive to manufacture, since they can be formed from plastic (acrylic, for example) in an injection molding process. In addition, they have high collecting efficiency and are very compact. For example, a collector element may be smaller than one cubic inch (16.4 cubic centimeters). Components that must handle high heat levels (e.g., components are placed in proximity to the light source) may require a ventilation system or may include portions formed from heat resistant materials, such as glass or Pyrex™.

The three most demanding lighting functions in automotive illumination systems are headlamp high beams, headlamp low beams, and stop lights. These functions may be implemented using a centralized light source having waveguide outputs that transmit the light to the appropriate output points on the vehicle (i.e., the headlamps and stop lights) and form beam patterns at each output location. However, inefficiencies in the light distribution components may make such a configuration impractical. One solution to this problem is to form a hybrid lighting subsystem by combining a conventional optical system, such as a headlamp, with components that receive light from the headlamp and transmit the light through waveguides or fiber optics to provide other lighting functions throughout the vehicle.

Four hybrid lighting subsystems, each including a high intensity discharge (HID) source, should provide enough light for an entire automobile. Less efficient systems may require additional HID sources. The HID source acts as a primary light source for a particular lighting function, such as a headlamp. In addition, the HID acts as a light source for other lighting functions throughout the vehicle. Light sources other than a HID source, such as high intensity infrared (HIR), halogen, cartridge bulbs, printed circuit (PC) bulbs, and other gas discharge and incandescent bulbs, may be used. The hybrid subsystem may employ focus-less optics (FLO) to receive and transmit light from the light source. Focus-less optics components include optical waveguides and collector elements, such as are described below and in U.S. application Ser. Nos. 08/697,930 ("Distributed Lighting System", filed Sep. 3, 1996) and 08/791,683 ("Optical Waveguide Elements for a Distributed Lighting System", filed Jan. 30, 1997), both which are incorporated herein by reference. A hybrid tail light subsystem may be used to provide stop lights, turn signals, backup lights, and a center high-mounted stop light (CHMSL).

A vehicle distributed lighting system may include hybrid headlamp subsystems, turn signal subsystems, and hybrid tail light subsystems. The hybrid headlamp subsystems may provide primary forward illumination for the vehicle. The headlamp subsystems may be light sources for other exterior lights, such as front turn signals of the subsystems and side markers, as well as interior lights, such as dashboard lights and dome lights. These other lights may be connected to the headlamp subsystems by optical waveguides. Similarly, the tail light subsystems provide light for rear turn signals and a center high mounted stop light. The subsystems of the DLS are interconnected so that the light source of one subsystem serves as a redundant light source for another subsystem.

The DLS may incorporate different types of optical waveguide structures to distribute light throughout the vehicle, including joints, elements with epoxy coatings, pinched end collector portions, integrated installation snaps, integrated input optics and integrated output lenses. The DLS may also include waveguide structures to provide illumination to portions of the vehicle interior, including cup holders, hand grips, and storage pockets.

A hybrid headlamp subsystem may include a light source. The light source may be a high-intensity discharge (HID) lamp. Light produced by the light source may be collected by a reflector and directed through a lens to provide the primary forward illumination for the vehicle. The hybrid headlamp subsystem may provide both high beam and low beam illumination. The subsystem may employ a number of different beam forming techniques, such as a fresnel lens that is moved by an actuator between a high beam position and a low beam position.

A solid molded plastic form or a bundle of plastic or glass fibers may be used to generate a desired headlamp beam pattern. The shape of the output end of the solid form or bundles, in conjunction with the properties of the focusing lens, may determine the beam pattern in the far field. The shape of the input end of the solid form may be configured to act as a collector element to receive light from a light source. A reflector may also be used to control the beam pattern. A lens may be moved to shift the hot spot of the beam between high beam and low beam positions.

A diffraction grating may be used to control the beam pattern of the headlamp or other lighting functions, such as stop lights and turn signals. The diffraction grating may include essentially transparent material that has a series of ridges on its surface. The width of the ridges may be approximately equal to the wavelength of the light produced by the light source. A portion of the light passing through the diffraction grating may be reflected back into the light source, depending upon the exit angle of the light ray. Most of the light travelling in a direction close to perpendicular may pass through the grating undisturbed. The grating may be used alone or in conjunction with lenses, solid forms or fiber bundles to provide a desired headlamp beam pattern.

The light source of the hybrid headlamp subsystem may act as a light source for other parts of the system. Waveguides having collector elements at their ends may be positioned close to the light source to receive light and transmit the light to other locations in the vehicle, such as to provide turn signals, interior lighting, fog lights, or side markers. The waveguides may also carry light to other lighting subsystems to provide redundancy, such as the opposite side headlamp or the tail lights. The number of collector elements may be increased as necessary to supply light to other lighting functions. The collector elements may be glass rods (such as Pyrex™ rods) with ends that are polished so as to be faceted or pinched to increase the acceptance angle of the collector element.

A waveguide may carry light from the headlamp subsystem light source to a side marker light. The waveguide may include colored plastic filters to provide a desired output color (e.g., amber) for the side marker. Another waveguide may provides light to the turn signal subsystem. The turn signal subsystem may include an independent light source and may use the input from the headlamp subsystem for redundancy.

The turn signal subsystem may use an electro-mechanical shutter or a liquid crystal light valve (LCLV) to modulate the light produced by the turn signal. A plastic colored filter may provide amber color for the turn signal. The electromechanical modulator may include an opaque shutter that is moved between an ON and OFF position by a solenoid. In the ON position, the shutter is moved away from the illumination path, so that essentially all of the light is transmitted. In the OFF position, the shutter blocks the illumination path so that no light is transmitted. The electromechanical modulator may be used with an amber-colored plastic filter to provide a desirable aesthetic effect (i.e., the turn signal appears amber when ON but has no color when OFF).

The LCLV may have two states. In the OFF state the LCLV may reflect or scatter most of the incident light. In the ON state the LCLV may become largely transparent (i.e., greater than 80% of the incident light may pass through). The ratio of the light transmitted in the ON state relative to the light transmitted in the OFF state (i.e., the contrast ratio) may be approximately 5:1. An infrared reflecting mirror may be used to shield the LCLV from infrared energy from the source to increase the expected life of the LCLV. LCLV modulators may be combined with diffraction gratings to improve the contrast ratio and achieve a desired beam pattern. The diffraction grating may lessen the amount of forward scattered light that is emitted. Focusing optics, such as lenses, may also be used to provide further beam pattern control.

Waveguides may carry light from the headlamp subsystem to other subsystems having their own light sources, such as the opposite headlamp subsystem or the corresponding tail light subsystem, to provide light source redundancy. When redundancy is employed and, for example, one of the headlamps fails, light from the operational headlamp will dimly illuminate the failed headlamp. Redundancy also may be used to reduce the effects of failure of other lighting components. An incandescent PC bulb may be used as a source for trunk lighting and may be connected to provide redundancy to interior reading lights.

A tail light subsystem may include a light source that provides primary rear illumination through a lens. The light source may be a HID lamp or another type of lighting source, such as an incandescent lamp.

A compact incandescent cartridge may be employed as a light source. The cartridge may include a housing having reflective, heat-dissipating interior surfaces. An incandescent bulb may be positioned in the center of the housing. Waveguide collector elements may be positioned around the light source. The waveguide collector elements may be formed by injection molding. The cartridge or similar incandescent sources may also be used as light sources elsewhere in the DLS, depending on lighting requirements. Networks of cartridges may be interconnected to provide redundant light sources for interior or exterior lighting functions in the DLS.

Waveguide collector elements in the tail light subsystem may be positioned close to the source to receive light and transmit the light to other lighting elements, such as the rear turn signals, backup lights, and center high-mounted stop light (CHMSL). A combination stop/rear turn signal light may be modulated with a LCLV. The backup lights and CHMSL may be modulated with electromechanical shutters.

A waveguide section may be used to provide a desired beam pattern for the rear turn signal. Light from a collector element or an independent light source may be received at the input of the waveguide section and internally reflected by the surfaces of the waveguide as it propagates. The waveguide may include a bend immediately prior to the output. The outer surface of the bend may be s-shaped to change the distribution of light across the output surface and the far field beam pattern of the turn signal.

A waveguide may be installed in the door to provide a security/puddle light. The waveguide may run from a light source, such as the hybrid headlamp subsystem to the bottom edge of the door. A waveguide branch may be used to implement a interior door light. When the door is closed, a door waveguide section may connect to a waveguide that passes through the floor. The floor waveguide section may provide a security light that illuminates the area underneath the vehicle. When the door is open, the door waveguide may provide a puddle light that illuminates the ground between the open door and the vehicle. The bend in the door waveguide section may have a bend angle of 20°. The bend may help to direct the output of the waveguide to the desired area.

A waveguide may carry light from a hybrid headlamp subsystem to the interior of the vehicle to provide dashboard lighting, dome lights, and reading lights. A ring-shaped waveguide element may be installed under the lip of a cup holder. The waveguide element may be any shape necessary to accommodate the shape and size of the cup holder. The waveguide may have a protruding, angled upper region to reflect light downward toward the bottom of the cup holder. The upper surface of the angled portion may be stippled and may be covered with a layer of opaque material to prevent leakage of light in the upward direction. A small incandescent bulb at the input of the waveguide may be used as a source. A colored filter may be placed between the source and the input to achieve a desired illumination color. When illuminated, the interior of the cup holder may glow faintly so as not to interfere with the driver's vision. The glowing illumination may allow the occupants of the vehicle to discern the location of the cup holder. Light for the waveguide may be provided by a waveguide connected to one of the lighting subassemblies.

A cupholder illumination waveguide may be wishbone-shaped for cupholders having a gap to accommodate a mug handle. A web portion that is thinner than the rest of the waveguide may be included between the two arms. The web may provide additional illumination to the portion of the interior of the cupholder directly beneath the split in the wishbone. A tab that is thinner than the rest of the waveguide may extend downward from the split. The tab may have a generally rectangular cross-section and may curve downward toward the bottom of the cupholder. The tab may have a chamfered leading edge.

A cupholder illumination waveguide may be configured for cupholders having a gap to accommodate a mug handle. Light may enter the input and be split unequally between a primary arm and a secondary arm having a smaller cross-section, i.e. thinner and narrower than the primary arm. The smaller cross-section of the secondary arm may allow less light to enter the secondary arm, which may balance the light in the two arms and provide uniform illumination around the circumference of the cupholder.

A waveguide may be used in the interior of a map pocket or along the interior surface of a hand grip. A length of waveguide may be installed along the inner surface. A small incandescent bulb may provide a light source. The bulb may be used in conjunction with a lens to provide a reading light. The hand grip may be connected by a waveguide to another light source in the DLS. The waveguide may be formed with snaps to make installation into the hand grip easier.

A waveguide joint may be used to distribute light in the DLS. A waveguide joint may be used to provide light to a door of the vehicle. The waveguide joint may have a trunk section with a convex curved end. Branch sections having convex curved ends may adjoin the trunk section. The branch sections may be held in place by a plastic band surrounding the joint region or by epoxy or snaps. Light input to the trunk section may be essentially split among the branches. The branches may be positioned to carry light to different sections of the vehicle. The branches may be reconfigurable in the event of design changes. Epoxy that has an index of refraction equal to that of the waveguide, i.e. index-matched, may be used to hold the branches in place. The joint may have only a single branch that is used to change the direction of the trunk or to provide a hinged connection. A hinged connection using the joint may be installed in a car door. Index-matched fluid may be used to lubricate and reduce discontinuity at the interface between the trunk and the branch to reduce the loss through the joint.

A waveguide may be encased in a layer of epoxy. The epoxy may have a lower index of refraction than the waveguide, so that a light ray passing through the waveguide is internally reflected at the waveguide/epoxy interface. The epoxy coating may be applied by dipping the waveguide in a reservoir of epoxy and allowing the coating to dry. The epoxy layer may prevent contaminants from reaching the internal waveguide/epoxy interface where reflection occurs. Plastic coatings may be applied to the outside surfaces of the epoxy layer, and clamps and other fixtures may be attached to the outside surfaces without affecting light transmission through the waveguide. A waveguide may be formed from polycarbonate (which has an index of refraction of 1.58) with an outer coating of acrylic (which has an index of refraction of 1.5). A waveguide may have a glass core and an outer coating having a lower index of refraction.

A waveguide may have a pinched end that acts as a collector element. The collector element may increase the acceptance angle of the waveguide to increase light collection efficiency. The end of the waveguide may be pinched in two dimensions to form an essentially trapezoidally shaped collector element. The collector element may be formed on the end of a waveguide having a rectangular or round cross-section. The walls at the tip of the waveguide may be inclined at an angle of 5° on each side. The pinched end of the waveguide may be formed so that an excess of material at the tip of the waveguide bulges outward to form a lens with a desired focal Length. The lens may focus received light to increase the acceptance angle of the waveguide.

Waveguides may have integrated installation elements, such as snaps and detents. Snaps may be formed during the injection molding of the waveguide to provide a convenient means for securing the waveguide within the vehicle. The vehicle may have brackets to receive the snaps or a screw may be inserted into a snap to secure the waveguide to a mounting surface. The detents may enable the waveguide to be securely connected to another waveguide having an integrated claw structure. Each waveguide may be formed with a detent at one end and a claw structure at the other.

A waveguide may have a key formed at one end. The key may be configured to mate with a socket of another waveguide to increase the ease with which waveguide components can be installed. The connection elements may cause a loss of approximately 4% at the interface. Index-matched epoxy may be used at the interface to secure the connection and reduce losses.

A waveguide may widen at one end into an output element having a convex curved surface. The curved surface of the output element may act as a lens to provide a desired light output characteristic. The output element may form an illumination element for the vehicle, e.g., a courtesy light in the door of a vehicle. A portion of the widened waveguide end may be eliminated, leaving an air gap, while maintaining desired output characteristics.

A waveguide may have a bend that is configured to allow a portion of the light travelling in the waveguide to escape at the bend. A lens may be used to focus the light to form a desired beam pattern. The amount of light released at the bend may be controlled by determining the inner radius of curvature of the bend relative to the width of the waveguide. The amount of light entering the lens may be proportional to the amount of light released at the bend.

Light may enter an optical manifold through one or more inputs and may be split to one or more output arms. Light may enter through one or more output arms and exit through the inputs. The output arms may branch off at multiple points from the optical manifold in multiple directions to direct light to other subsystems of the DLS in various locations within the vehicle. The size of the output arms and their locations may determine the proportion of the light input to the manifold that is split to each arm.

The optical manifold may include integrated output elements. The output element may be lens-like structures that provide lighting functions within the vehicle, such as a reading lights or dashboard lights. The manifold may have multiple input and output arms and a portion where light from the various inputs is combined. Each input and output may use colored filters to achieve desired lighting effects.

Other features and advantages will be apparent from the following detailed description, including the drawings, and from the claims.

BRIEF DESCRIPTION OF THE DRAWINGS

FIGS. 11A–11F show various embodiments of a cupholder illumination component.

FIG. 12A is a rear view of a waveguide installed in a handgrip.

FIG. 12B is a cross-section view of a waveguide and light source installed in a handgrip.

FIG. 12C shows a waveguide with integrated snaps for installation into a handgrip.

FIG. 15 is a cross-section view of an epoxy-coated optical waveguide.

FIGS. 16A–16C are cross-section views of non-tapered and tapered waveguide inputs.

FIGS. 17A and 17B are cross-section views of waveguide sections having integrated installation components and an integrated output structure.

FIG. 18 shows a leaky waveguide bend and focusing lens.

DESCRIPTION

Figure 1:
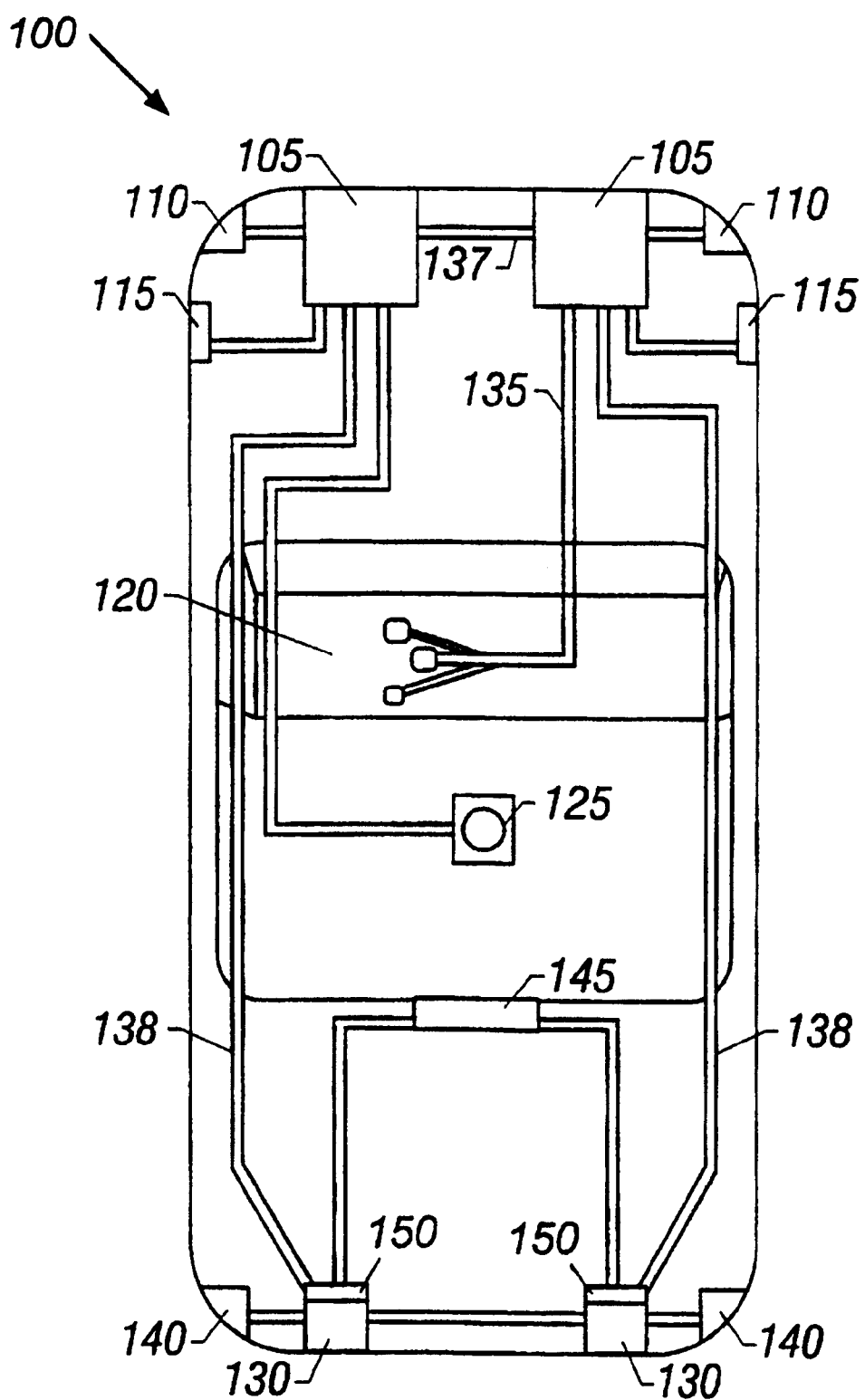
FIG. 1 is a block diagram of a vehicle distributed lighting system with hybrid lighting subsystems.

Referring to FIG. 1, a vehicle distributed lighting system (DLS) 100 includes hybrid headlamp subsystems 105, turn signal subsystems 110 and 140, and hybrid tail light subsystems 130. The hybrid headlamp subsystems 105 provide primary forward illumination for the vehicle. The headlamp subsystems 105 are also light sources for other exterior lights, such as front turn signals of the subsystems 110 and side markers 115, as well as interior lights, such as dashboard lights 120 and dome lights 125. These other lights are connected to the headlamp subsystems by optical waveguides 135. Similarly, the tail light subsystems 130 provide light for rear turn signals 140 and a center high mounted stop light (CHMSL) 145. The subsystems of the DLS are interconnected so that the light source of one subsystem serves as a redundant light source for another subsystem.

The DLS incorporates different types of optical waveguide structures to distribute light throughout the vehicle. These include joints, elements with epoxy coatings, pinched end collector portions, integrated installation snaps, integrated input optics and integrated output lenses. The DLS also includes waveguide structures to provide illumination to portions of the vehicle interior, including cup holders, hand grips, and storage pockets.

Figure 2:
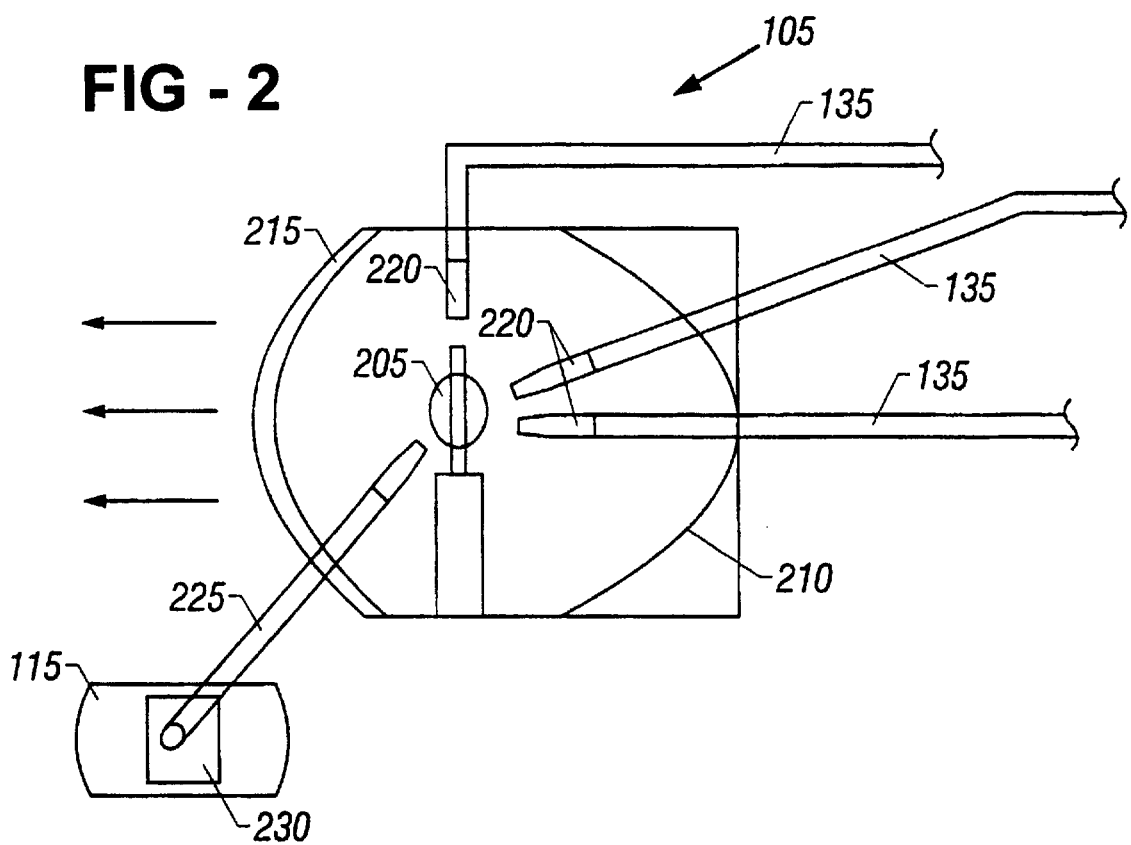
FIG. 2 shows a hybrid headlamp subsystem.

FIG. 2 illustrates a hybrid headlamp subsystem 105. The subsystem includes a light source 205 that may be implemented using, for example, a high-intensity discharge (HID) lamp. Light produced by the light source 205 is collected by a reflector 210 and directed through a lens 215 to provide the primary forward illumination for the vehicle. The reflector may be implemented as a parabolic or complex reflector.

Figure 3:
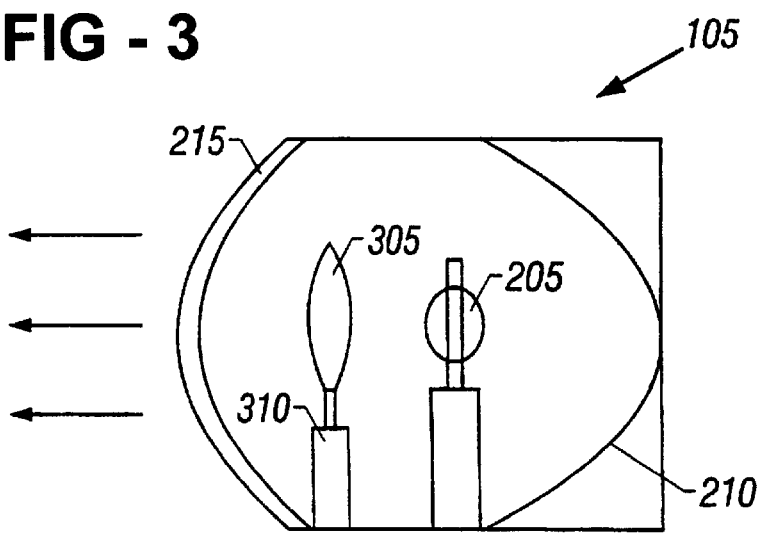
FIG. 3 shows a hybrid headlamp subsystem with a movable lens.

The hybrid headlamp subsystem 105 provides both high beam and low beam illumination. To this end, the subsystem may employ a number of different beam forming techniques, as shown in FIGS. 3–5. For example, FIG. 3 shows a simple fresnel lens 305 that is moved by an actuator 310 between a high beam position and a low beam position. The movement of the lens 305 shifts the position of the "hot spot" (i.e., the area of most concentrated light) of the headlamp beam in the far field between the appropriate positions for the high and low beams. Other portions of the beam also will shift as the lens moves.

Figure 4A:
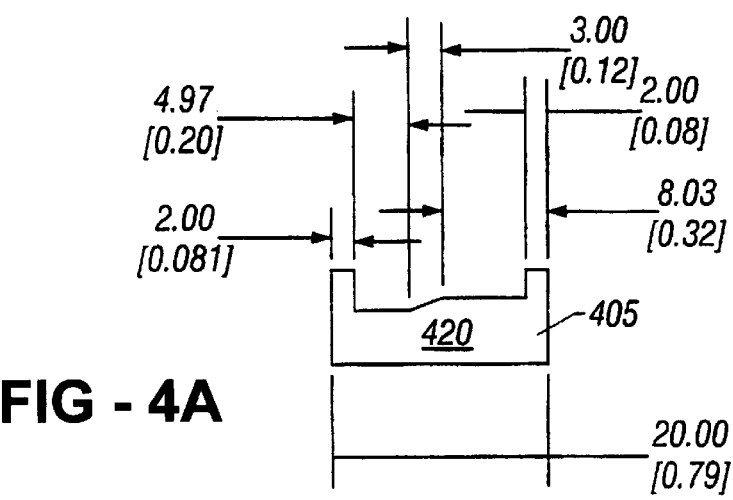
FIGS. 4A–4D show headlamp beam forming structures.
Figure 4B:
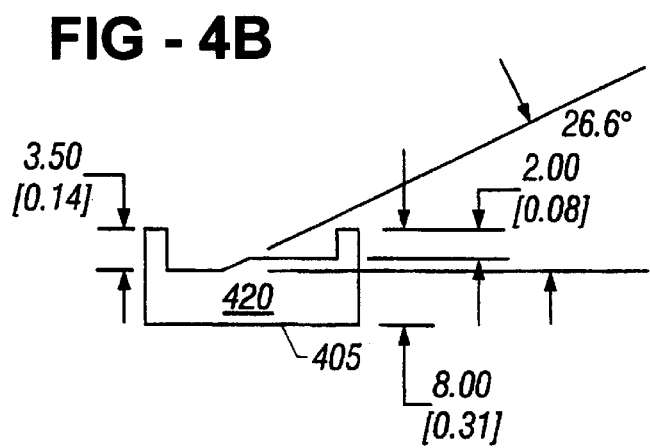
Figure 4C:
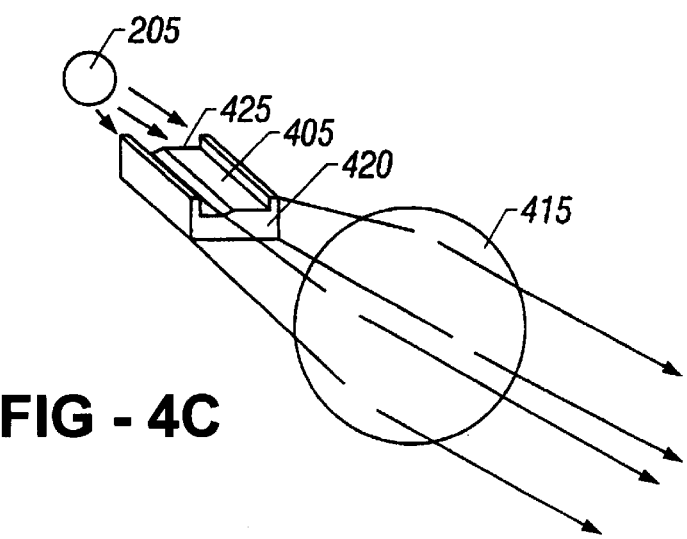
Figure 4D:
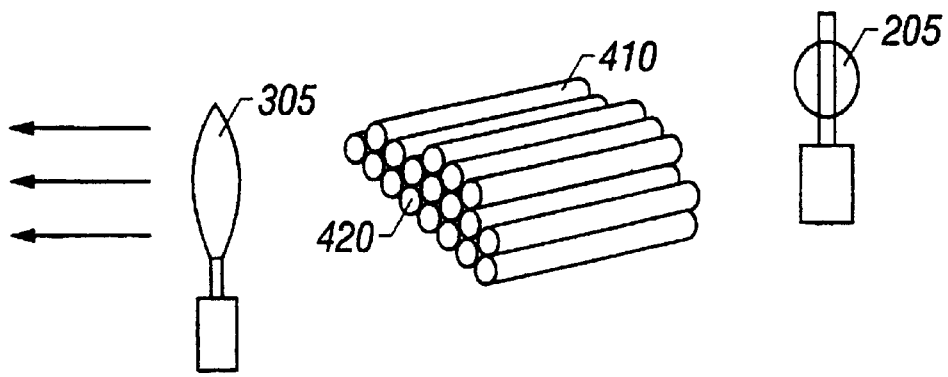
Figure 5:
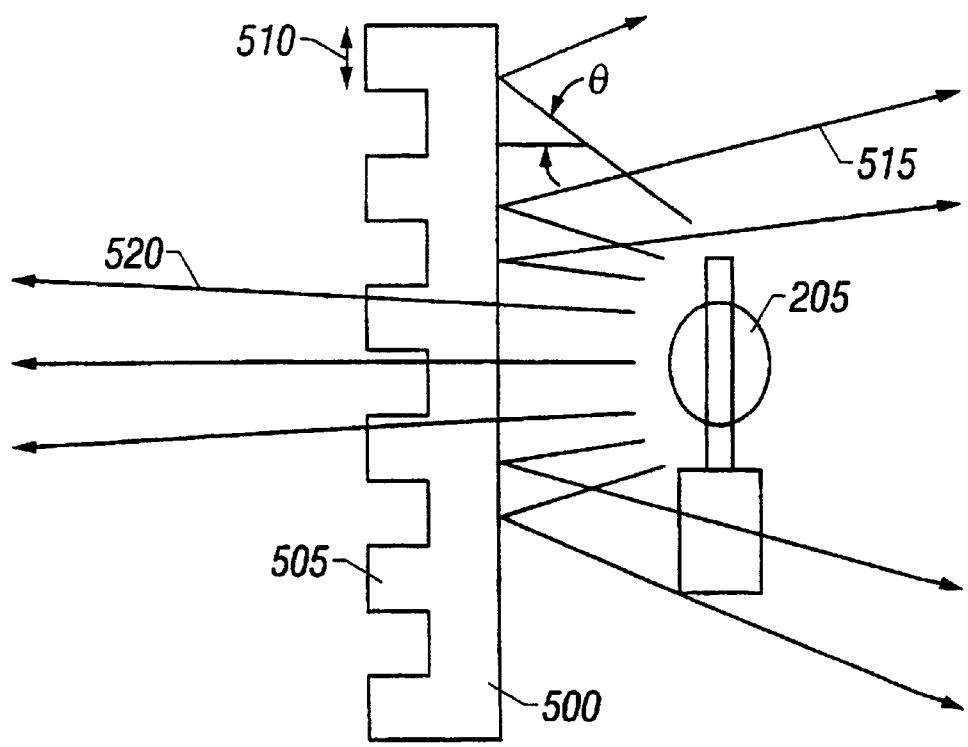
FIG. 5 shows a light source with a diffusion grating.

FIGS. 4A–4D show the use of a solid molded plastic form 405 (FIGS. 4A–4C) or a bundle of plastic or glass fibers 410 (FIG. 4D) to generate a desired headlamp beam pattern. Light from light source 205 passes through the form 405 or bundles 410 and then passes through a focusing lens 415. The shape of the output end 420 of the solid form or bundles, in conjunction with the properties of the focusing lens, determines the beam pattern in the far field. To increase light collection efficiency, the shape of the input end 425 of the solid form may be configured to act as a collector element to receive light from a light source. A reflector 215 may also be used to control the beam pattern, as in FIGS. 2 and 3. FIGS. 4A–4C show dimensions in mm of a thickness profile that might be used to achieve a desired beam pattern. Similarly, the bundle of fibers can be formed into a desired profile. As with the implementation shown in FIG. 3, the lens 305 may be moved to shift the hot spot of the beam between high beam and low beam positions.

FIG. 5 shows the use of a diffraction grating 500 to control the headlamp beam pattern (the diffraction grating may also be used for other lighting functions, such as stop lights and turn signals). The diffraction grating 500 includes essentially transparent material that has a series of ridges 505 on its surface. The width 510 of the ridges is approximately equal to the wavelength of the light produced by the light source 205. A portion 515 of the light passing through the diffraction grating 500 is reflected back into the light source, with the size of the portion depending upon the exit angle ($\theta$) of the light ray. Most of the light 520 travelling in a direction close to perpendicular ($\theta=0°$) passes through the grating undisturbed. By limiting the exit angle ($\theta$) of the headlamp illumination, the grating 500 may provide, for example, a more focused headlamp beam in the far field. The grating 500 may be used alone or in conjunction with lenses 305, solid forms 405 or fiber bundles 410 described above to provide a desired headlamp beam pattern.

In addition to providing the primary forward illumination, the light source 205 acts as a light source for other parts of the system. As shown in FIG. 2, waveguides 135 having collector elements 220 at their ends are positioned close to the light source 205 to receive light and transmit the light to other locations in the vehicle, such as to provide turn signals, interior lighting, fog lights, and side markers. The waveguides 135 may also carry light to other lighting subsystems to provide redundancy, such as the opposite side headlamp or the tail lights. The number of collector elements 220 may be increased as necessary to supply light for other lighting functions. The collector elements 220 may be glass rods (such as Pyrex) with ends that are polished so as to be faceted or pinched. The pinched ends increase the acceptance angle of the collector element.

FIG. 2 shows a waveguide 225 that carries light from the source to a side marker light 115. The waveguide 225 may include colored plastic filters 230 to provide a desired output color (e.g., amber) for the side marker 115. This configuration eliminates the need for an electrical connection and light bulb in the side marker 115.

Another waveguide provides light to the turn signal subsystem 110. Alternatively, the turn signal subsystem 110 may include an independent light source and may use the input from the headlamp subsystem 105 for redundancy.

As shown in FIGS. 6A–6D, some implementations of the turn signal subsystem use an electromechanical shutter 605 (FIGS. 6A and 6B) while others use a liquid crystal light valve (LCLV) 610 (FIGS. 6C and 6D) to modulate the light produced by the turn signal. A plastic colored filter provides amber color for the turn signal. The use of a colored filter eliminates the need for light bulbs enclosed in cadmium-doped glass.

Figure 6A:
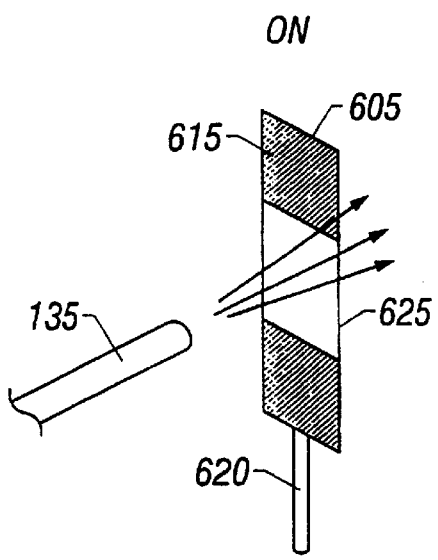
FIGS. 6A–6F show waveguide outputs modulated with electromechanical or liquid crystal light valves.
Figure 6B:
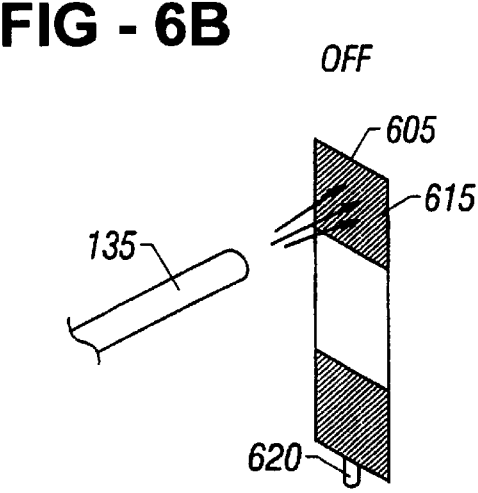

The electromechanical modulator 605, as shown in FIGS. 6A and 6B, includes an opaque shutter 615 that is moved between an ON (FIG. 6A) and OFF (FIG. 6B) position by a solenoid 620. In the ON position, the shutter 615 is moved away from the illumination path, so that essentially all of the light is transmitted. In the OFF position, the shutter 615 blocks the illumination path so that no light is transmitted. The use of an electromechanical modulator 605 with an amber-colored plastic filter provides a desirable aesthetic effect (i.e., the turn signal appears amber when ON but has no color when OFF).

Figure 6C:
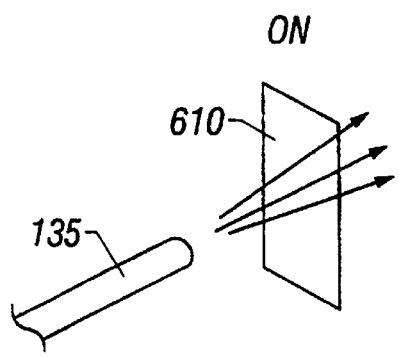
Figure 6D:
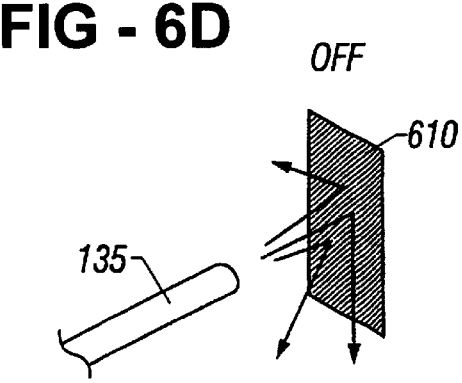

The LCLV illustrated in FIGS. 6C and 6D has no mechanical components. This increases the reliability of the LCLV relating to systems that include mechanical components. The LCLV 610 has two states. In the OFF state (FIG. 6D) the LCLV 610 reflects or scatters most of incident light. In the ON state (FIG. 6C) the LCLV 610 becomes largely transparent (i.e., greater than 80% of incident light passes through the LCLV). The ratio of the light transmitted in the ON state relative to the light transmitted in the OFF state (i.e., the contrast ratio) is approximately 5:1, which meets SAE requirements for a turn signal. A contrast ratio of 5:1 also meets the SAE requirements for stop lights used as turn signals. An infrared reflecting mirror (not shown) may be used to shield the LCLV from infrared energy from the source, thereby increasing the expected life of the LCLV.

Figure 6E:
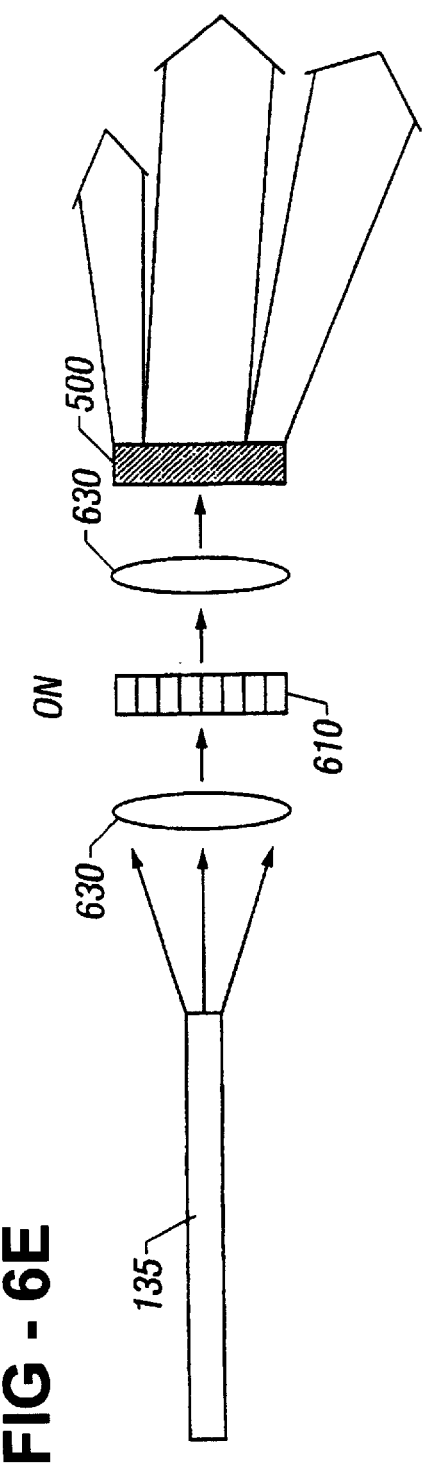
Figure 6F:
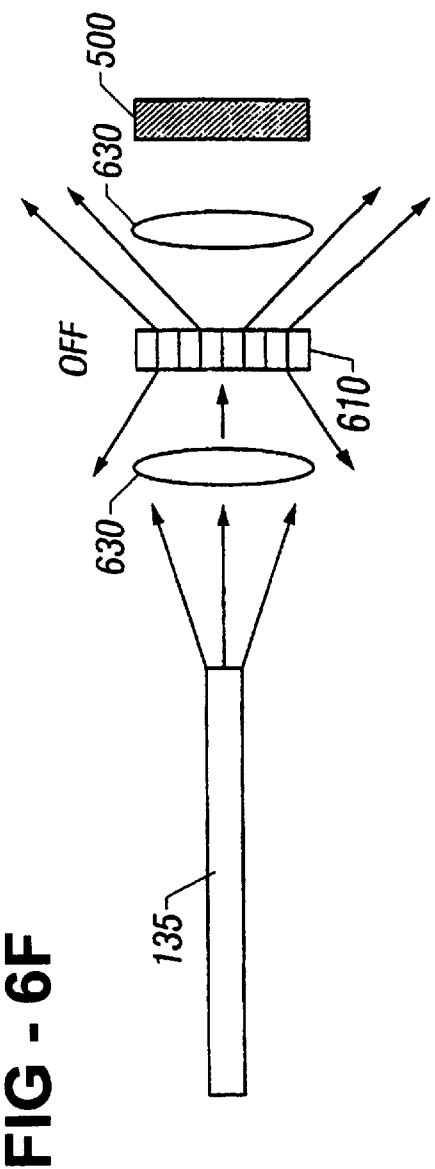

As shown in FIGS. 6E and 6F, LCLV modulators 610 may be combined with diffraction gratings 500 to improve the contrast ratio and achieve a desired beam pattern. As discussed above, light from the light source (waveguide 135) is scattered when the LCLV is OFF (FIG. 6F). The diffraction grating 500 lessens the amount of forward scattered light that is emitted. Focusing optics, such as lenses 630, may also be used to provide further beam pattern control.

Referring again to FIG. 1, waveguides also may carry light from the headlamp subsystem to other subsystems that have their own light sources, such as the opposite headlamp subsystem (waveguide 137) or the corresponding tail light subsystem (waveguide 138), to provide light source redundancy. When redundancy is employed and, for example, one of the headlamps fails, light from the operational headlamp will dimly illuminate the failed headlamp. This is safer for the operator of the vehicle than having only one operational headlamp. Redundancy also may be used to reduce the effects of failure of other lighting components. For example, an incandescent PC bulb may be used as a source for trunk lighting and may be connected to provide redundancy to interior reading lights.

Figure 7:
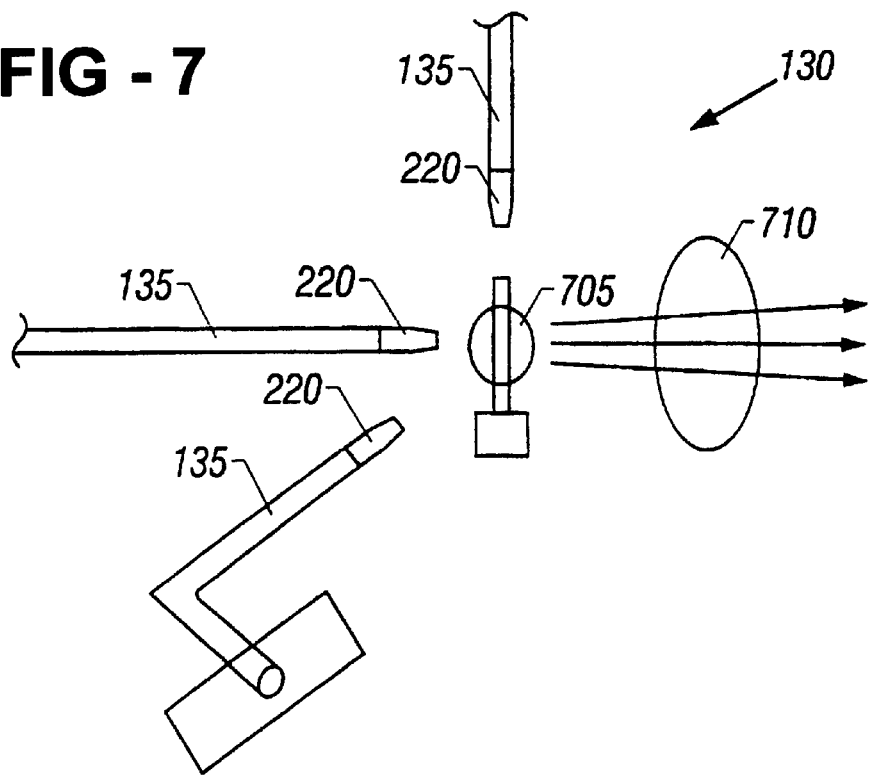
FIG. 7 shows a hybrid tail light subsystem.

The tail light subsystems 130 of FIG. 1 operate similarly to the headlamp subsystems. As shown in FIG. 7, a tail light subsystem 130 has a light source 705 that provides primary rear illumination through a lens 710. The light source 705 may be a HID lamp or another type of lighting source, such as an incandescent lamp, since the lighting requirement (in lumens) generally is less than the requirement for a headlamp. In general, an incandescent source is significantly less expensive than an HID source.

Figure 8:
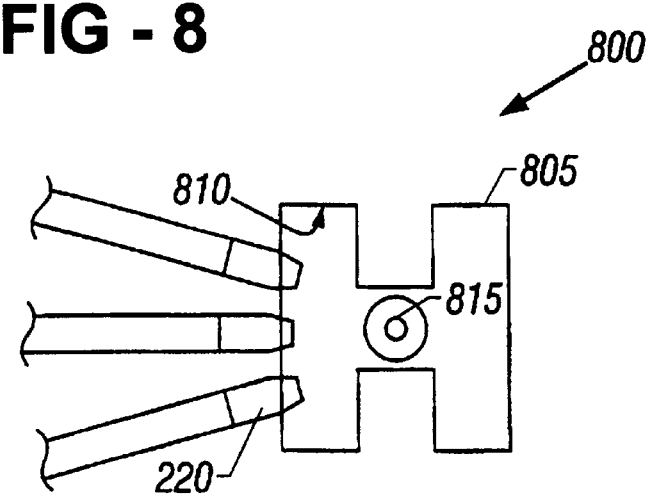
FIG. 8 shows a compact incandescent cartridge.

A compact incandescent cartridge 800, such as shown in FIG. 8, may be employed as the light source 705. The cartridge 800 includes a housing 805 having reflective, heat-dissipating interior surfaces 810. An incandescent bulb 815 is positioned in the center of the housing 805. Waveguide collector elements 220 are positioned around the light source. The incandescent cartridge 800 has a compact size, stays cool, and reduces lamp placement error, which increases efficiency. In addition, construction of the waveguide collector elements 220 from injection molding is easy and inexpensive. The cartridge 800 or similar incandescent sources may also be used as light sources elsewhere in the DLS, depending on lighting requirements. In addition, networks of cartridges 800 may be interconnected to provide redundant light sources for interior or exterior lighting functions in the DLS.

Referring again to FIG. 7, waveguide collector elements 220 in the tail light subsystem are positioned close to the source 705 to receive light and transmit the light to other lighting elements, such as the rear turn signals 140, backup lights 150, and center high-mounted stop light (CHMSL) 145. A combination stop/rear turn signal light may be modulated with a LCLV 610, as discussed above with respect to the forward turn signals. The backup lights 150 and CHMSL 145, however, are modulated with electromechanical shutters 615, since they must be completely dark in the OFF mode.

Figure 9A:
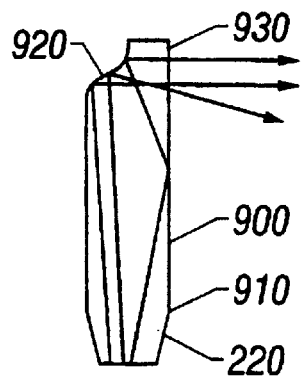
FIGS. 9A and 9B show a waveguide output bend for a tail light.
Figure 9B:
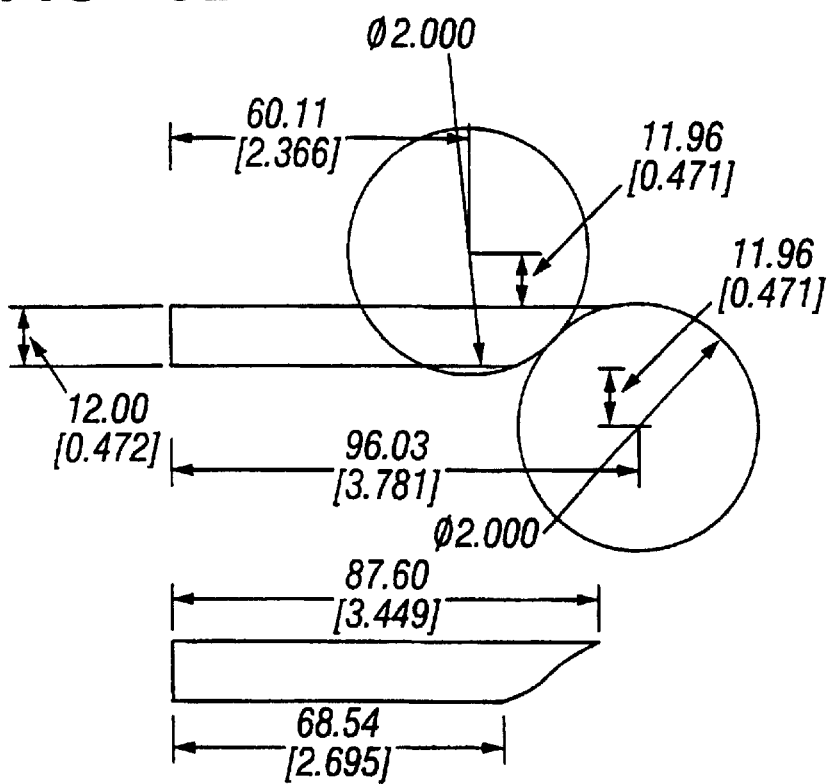

The rear turn signals subsystems 140 also may be implemented in the manner shown in FIGS. 9A and 9B. In particular, a waveguide section 900 may be used to provide a desired beam pattern for the rear turn signal. Light from a collector element 220 or an independent light source is received at the input 910 of the waveguide section 900 and is internally reflected by the surfaces of the waveguide as it propagates. The waveguide 900 includes a bend 920 immediately prior to the output 930. The outer surface of the bend 920 is s-shaped, which changes the distribution of light across the output surface 930 and hence the far field beam pattern of the turn signal. As an example, FIG. 9B shows dimensions in mm of a waveguide 900 that might be used to provide a desired beam pattern.

Figure 10A:
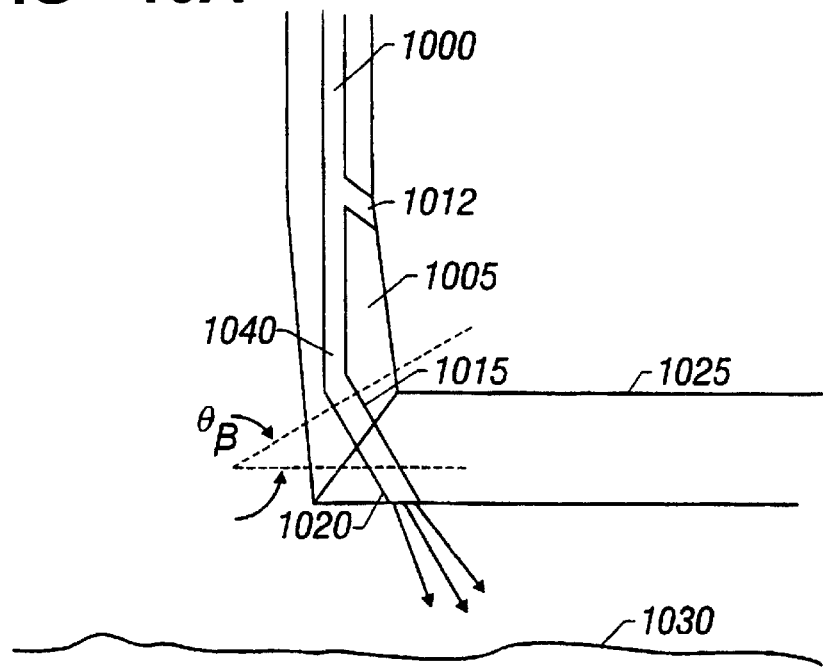
FIGS. 10A and 10B show a combination security/puddle light.
Figure 10B:
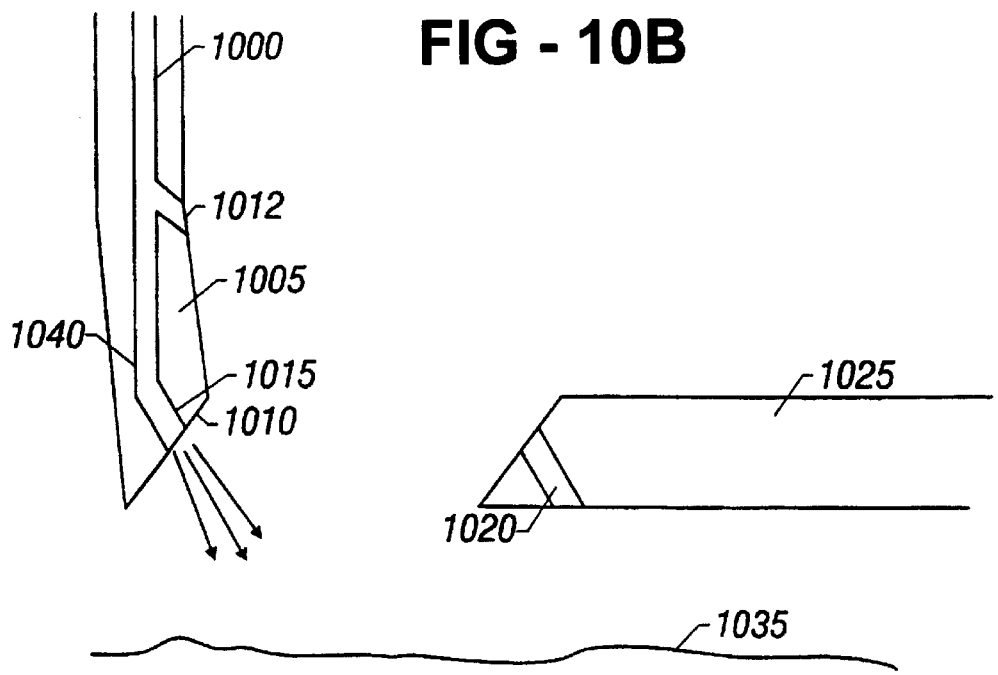

The DLS also may be used to provide other lighting functions. For example, a waveguide 1000 may be installed in the door 1005, as shown in FIGS. 10A and 10B, to provide a security/puddle light. The waveguide 1000 runs from a light source, such as the hybrid headlamp subsystem 105 (FIG. 1), to the bottom edge 1010 of the door 1005. A waveguide branch 1012 may be used to implement a interior door light. When the door 1005 is closed, as in FIG. 10A, a door waveguide section 1015 connects to a waveguide 1020 that passes through the floor 1025. The floor waveguide section 1020 provides a security light that illuminates the area 1030 underneath the vehicle. When the door 1005 is open, as in FIG. 10B, the door waveguide 1015 provides a puddle light that illuminates the ground 1035 between the open door and the vehicle. The bend 1040 in the door waveguide section 1015 may have a bend angle ($\theta_B$) of, for example, 20°. The bend 1040 helps to direct the output of the waveguide 1000 to the desired area.

Another waveguide carries light from hybrid headlamp subsystem to the interior of the vehicle to provide, for example, dashboard lighting, dome lights, and reading lights. Waveguides also provide unique, aesthetically pleasing lighting effects for certain interior structures, such as cup holders, map pockets, and hand grips.

Figure 11A:
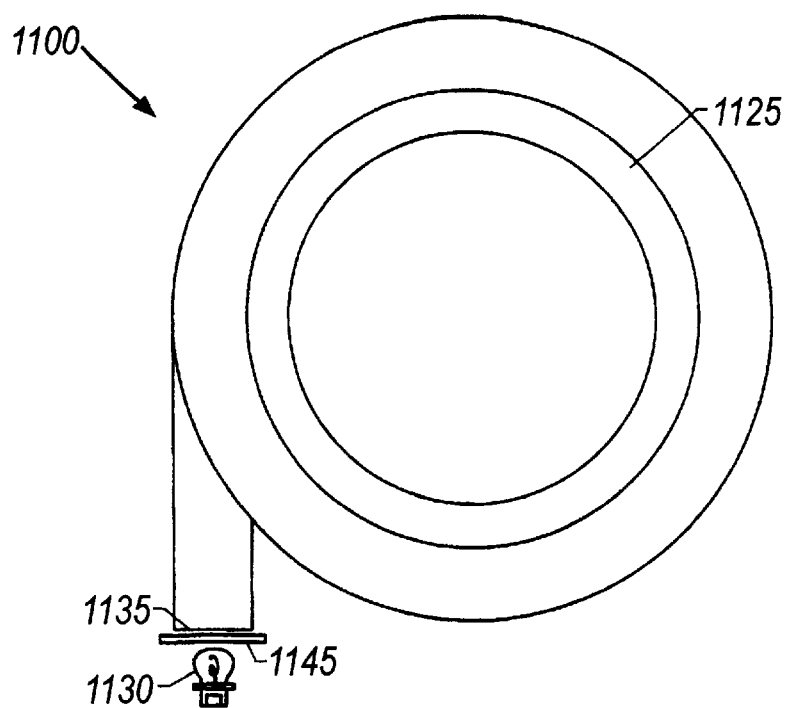
Figure 11B:
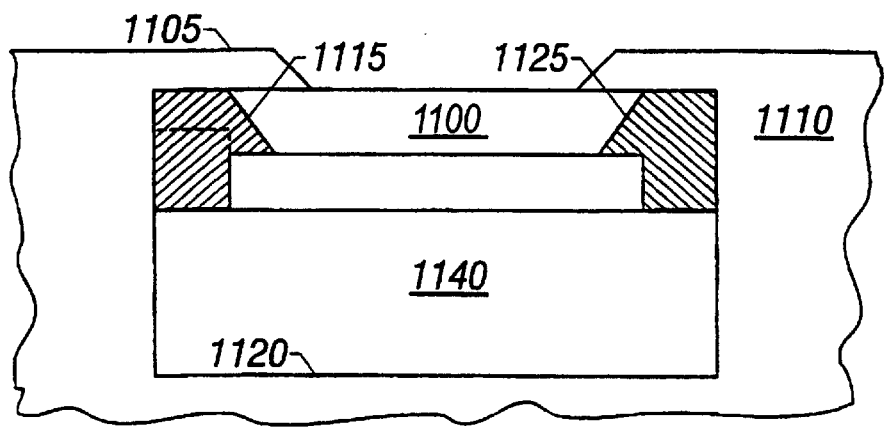

For example, as shown in FIGS. 11A and 11B, a ring-shaped waveguide element 1100 may be installed under the lip 1105 of a cup holder 1110. Although the shape of the waveguide 1100 in FIGS. 11A and 11B is circular, any shape may be used depending upon the shape and size of the cup holder 1100. The waveguide 1100 may have a protruding, angled upper region 1115 to reflect light downward toward the bottom 1120 of the cup holder 1110. The upper surface 1125 of the angled portion 1115 may be stippled and may be covered with a layer of opaque material to prevent leakage of light in the upward direction. A small incandescent bulb 1130 at the input 1135 of the waveguide is used as a source. A colored filter 1145 may be placed between the source 1130 and the input 1135 to achieve a desired illumination color. When illuminated, the interior 1140 of the cup holder 1110 glows faintly so as not to interfere with the driver's vision. The glowing illumination allows the occupants of the vehicle to discern the location of the cup holder 1110. Light for the waveguide 1100 also may be provided by a waveguide 135 connected to one of the lighting subassemblies.

Another embodiment of the cupholder illumination waveguide 1100 is shown in FIGS. 11C–11D. These "wishbone" shaped waveguides 1100 are configured for cupholders having a gap 1150 to accommodate a mug handle. Light for the waveguide 1100 enters the input 1135 and is split essentially equally to the two arms 1155 of the wishbone. The split in the waveguide 1100 may lead to a dark area in the illumination of the cupholder. Therefore, as shown in FIG. 11C, a web portion 1160 is included between the two arms 1155. The web portion is thinner than the rest of the waveguide 1100 and provides additional illumination to the portion of the interior 1140 of the cupholder directly beneath the split in the wishbone.

Alternatively, as shown in FIG. 11D, a tab 1165 that is thinner than the rest of the waveguide 1100 may extend downward from the split. The tab 1165 has a generally rectangular cross-section and curves downward toward the bottom 1120 of the cupholder. As shown in FIG. 1E, the tab 1165 may have a chamfered leading edge 1170.

Yet another embodiment of the cupholder illumination waveguide 1100 is shown in FIG. 11F. As in the previous embodiment, the waveguide 1100 is configured for cupholders having a gap 1150 to accommodate a mug handle. Light enters the input 1135 and is split unequally between a primary arm 1175 and a secondary arm 1180. The secondary arm has a smaller cross-section, (i.e., is thinner and narrower than the primary arm 1175. Since the secondary arm 1180 is shorter than the primary arm 1175, there is less loss along its length. The smaller cross-section of the secondary arm 1180 allows less light to enter the secondary arm, which balances the light in the two arms 1175 and 1180 provides uniform illumination around the circumference of the cupholder.

Similar structures may be used in the interior of a map pocket or, as shown in FIGS. 12A–12C, along the interior surface 1205 of a hand grip 1200. A length of waveguide 1210 is installed along the inner surface 1205. A small incandescent bulb 1215 provides a light source. The bulb may be used in conjunction with a lens (not shown) to provide a reading light. Alternatively, the hand grip 1200 may be connected by a waveguide to another light source in the DLS. As shown in FIG. 12C, the waveguide 1210 may be formed with snaps 1220 and 1225 to make installation into the hand grip 1200 easier.

Figure 13:
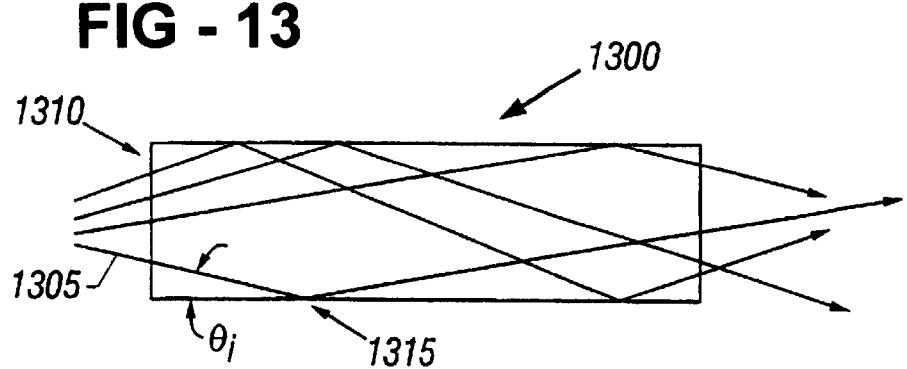
FIG. 13 is a cross-section view of an optical waveguide.

Different types of waveguide structures may be used in the DLS to transmit light from the sources to the lighting outputs. A basic waveguide, as shown in FIG. 13, may be formed from optically transparent material such as acrylic or glass. If the waveguide is formed from acrylic or a similar material, it can be manufactured using an injection molding process. The manufacture of waveguide elements using injection molding results in very low manufacturing costs compared to fiber optics. In addition, molded acrylic waveguide elements are more rigid than fiber optics, can be installed by robots, and generally do not require maintenance. Waveguide elements can also achieve much smaller bend radii than fiber.

As shown in FIG. 13, a light ray 1305 entering the input face 1310 proceeds through the waveguide 1300 until the light ray 1305 reaches an outer surface 1315 of the waveguide 1300, i.e. an interface between the material of the waveguide 1300 and air. At the outer surface 1315, light is reflected in accordance with Snell's law. If the angle of incidence ($\theta_i$) of the light ray 1305 at the outer surface 1315 is less than a threshold referred to as the critical angle ($\theta_c$), then the light ray 1305 is reflected internally, with no light escaping. This phenomenon is known as total internal reflection. The critical angle depends on the index of refraction of the material of which the waveguide is composed relative to that of the material surrounding the waveguide, (e.g., air). For example, if the waveguide were made from acrylic, which has an index of refraction of approximately 1.5, and surrounded by air, the critical angle, $\theta_c$, would be:

$$\theta_c = \arcsin(n_a/n_b) = \arcsin(1/1.5) = 41.8$$

where $n_a$ is the index of refraction of air (1.0) and $n_b$ is the index of refraction of acrylic (1.5).

Figure 14A:
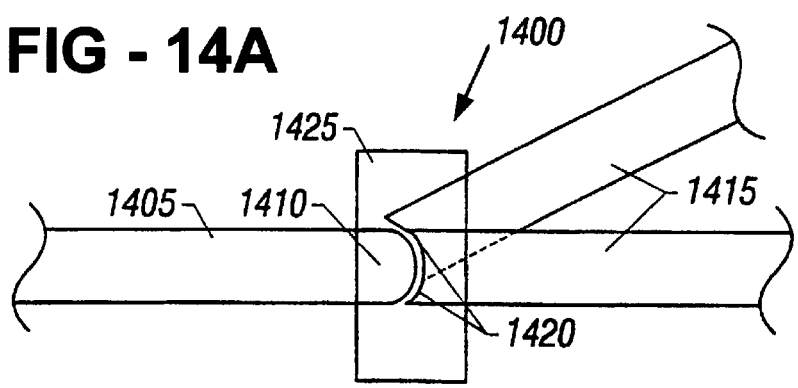
FIGS. 14A and 14B are side and bottom views of a waveguide joint.
Figure 14B:
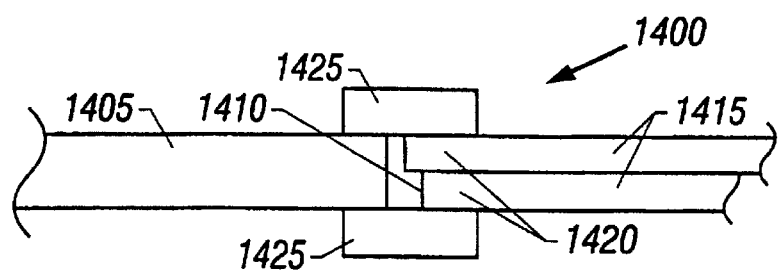

Referring to FIGS. 14A and 14B, a waveguide joint 1400 may be used to distribute light in the DLS. For example, the joint may be used to provide light to a door of the vehicle. The waveguide joint 1400 has a trunk section 1405 with a convex curved end 1410. Branch sections 1415 having convex curved ends 1420 adjoin the trunk section 1405. The branch sections may be held in place by a plastic band 1425 surrounding the joint region or by epoxy or snaps. Light input to the trunk section 1405 is essentially split among the branches 1415. The branches 1415 may be positioned to carry light to different sections of the vehicle. It is also possible to reconfigure the branches 1415 in the event of design changes. Epoxy that has an index of refraction equal to that of the waveguide, i.e., that is index-matched, may be used to hold the branches 1415 in place. The joint 1400 may have only a single branch 1415 that is used to change the direction of the trunk 1405 or to provide a hinged connection. A hinged connection using the joint 1400 may be installed, for example, in a car door. Index-matched fluid may be used to lubricate and reduce discontinuity at the interface between the trunk 1405 and the branch 1415, which will reduce the loss through the joint 1400.

FIG. 15 shows a waveguide 1500 encased in a layer of epoxy 1505. The epoxy 1505 has a lower index of refraction than the waveguide 1500, so that a light ray 1510 passing through the waveguide 1500 is internally reflected at the waveguide/epoxy interface 1515. The epoxy coating 1505 may be applied by dipping the waveguide 1500 in a reservoir of epoxy and allowing the coating to dry. The epoxy coating 1505 offers several advantages compared to an uncoated waveguide. For example, contaminants on the surface of an uncoated waveguide can cause light at the waveguide/air interface to scatter instead of being internally reflected, which increases loss in the uncoated waveguide. The epoxy layer 1505 prevents contaminants from reaching the internal waveguide/epoxy interface 1515 where reflection occurs. In addition, plastic coatings can be applied to the outside surfaces 1520 of the epoxy layer, and clamps and other fixtures can be attached to the outside surfaces 1520 without affecting light transmission through the waveguide 1500. As an alternative to epoxy, one could use a waveguide formed from polycarbonate (which has an index of refraction of 1.58) with an outer coating of acrylic (which has an index of refraction of 1.5). One also could use a waveguide having a glass core and an outer coating having a lower index of refraction.

As shown in FIGS. 16A–C, a waveguide 1600 may have a pinched end that acts as a collector element 1605. The collector element 1605 increases the acceptance angle ($\alpha$) of the waveguide 1600 and thereby increases light collection efficiency. The end of the waveguide 1600 may be pinched in two dimensions to form an essentially trapezoidally shaped collector element 1605. The collector element 1605 may be formed on the end of a waveguide 1600 having a rectangular or round cross-section.

For example, FIG. 16A shows a waveguide 1610 without a pinched end. If the critical angle ($\theta_c$) of the waveguide is 45°, the acceptance angle ($\alpha$) will also be 45°. Light 1615 from a light source 1620 entering the waveguide 1610 at an angle greater than 45° will exit the waveguide 1610 rather than being reflected at the outer surface 1625. A waveguide 1600 having a pinched end, as shown in FIG. 16B, may have an acceptance angle ($\alpha$) greater than the critical angle ($\theta_c$). Assuming $\theta_c=45°$ and the inclined walls 1630 of the waveguide are inclined at an angle of 5° on each side, then the acceptance angle ($\alpha$) will be 50°. As shown in FIG. 16C, the pinched end of the waveguide 1600 may be formed so that an excess of material at the tip of the waveguide 1600 bulges outward to form a lens 1635 with a desired focal length. The lens 1635 focuses received light, further increasing the acceptance angle of the waveguide 1600.

The waveguides may be formed as a set of standard components that may be easily interconnected and used as building blocks for different applications. For example, FIG. 17A shows waveguides 1700 and 1705 having integrated installation elements, such as snaps 1710 and detents 1715. Snaps 1710 can be formed during the injection molding of the waveguide 1700 and provide a convenient means for securing the waveguide 1700 within the vehicle. The vehicle may have brackets to receive the snaps 1710 or a screw may be inserted into a snap 1710 to secure the waveguide to a mounting surface. The detents 1715 enable the waveguide 1700 to be securely connected to another waveguide 1705 having an integrated claw structure 1720. Each waveguide may be formed with a detent 1715 at one end and a claw structure 1720 at the other.

FIG. 17B shows waveguides with integrated connection elements. A waveguide 1740 may have a key 1745 formed at one end. The key 1745 is configured to mate with a socket 1750 of another waveguide 1755. These connection elements may cause a loss of approximately 4% at the interface, however, the connection elements increase the ease with which waveguide components can be installed. Index-matched epoxy may be used at the interface to secure the connection and reduce losses.

In addition to the installation and connection elements, the waveguide 1700 widens at one end into an output element 1725 having a convex curved surface 1730. The curved surface 1730 of the output element 1725 essentially acts as a lens to provide a desired light output characteristic. The output element 1725 may form an illumination element for the vehicle, e.g., a courtesy light in the door of a vehicle. A portion of the widened waveguide end may be eliminated, leaving an air gap 1735, while maintaining desired output characteristics. The air gap 1735 decreases the weight and cost of the waveguide 1700.

Another configuration for an output element is shown in FIG. 18. A waveguide 1800 has a bend 1805 that is configured to allow a portion of the light travelling in the waveguide to escape at the bend 1805. A lens 1810 may be used to focus the light to form a desired beam pattern. The amount of light released at the bend 1805 can be controlled by determining the inner radius (r) of curvature of the bend 1805 relative to the width (w) of the waveguide 1800. For example, a bend with a inner bend radius to waveguide width ratio (r/w) of 3:1 will lose less than 5% of the light in the bend. A bend ratio of 1:1 will result in a loss of approximately 30–35%, and a bend ratio of 0.1:1 will result in a loss of approximately 65–70%. Not all of the light released at the bend enters the lens, however the amount of light entering the lens will be proportional to the amount of light released at the bend.

Figure 19A:
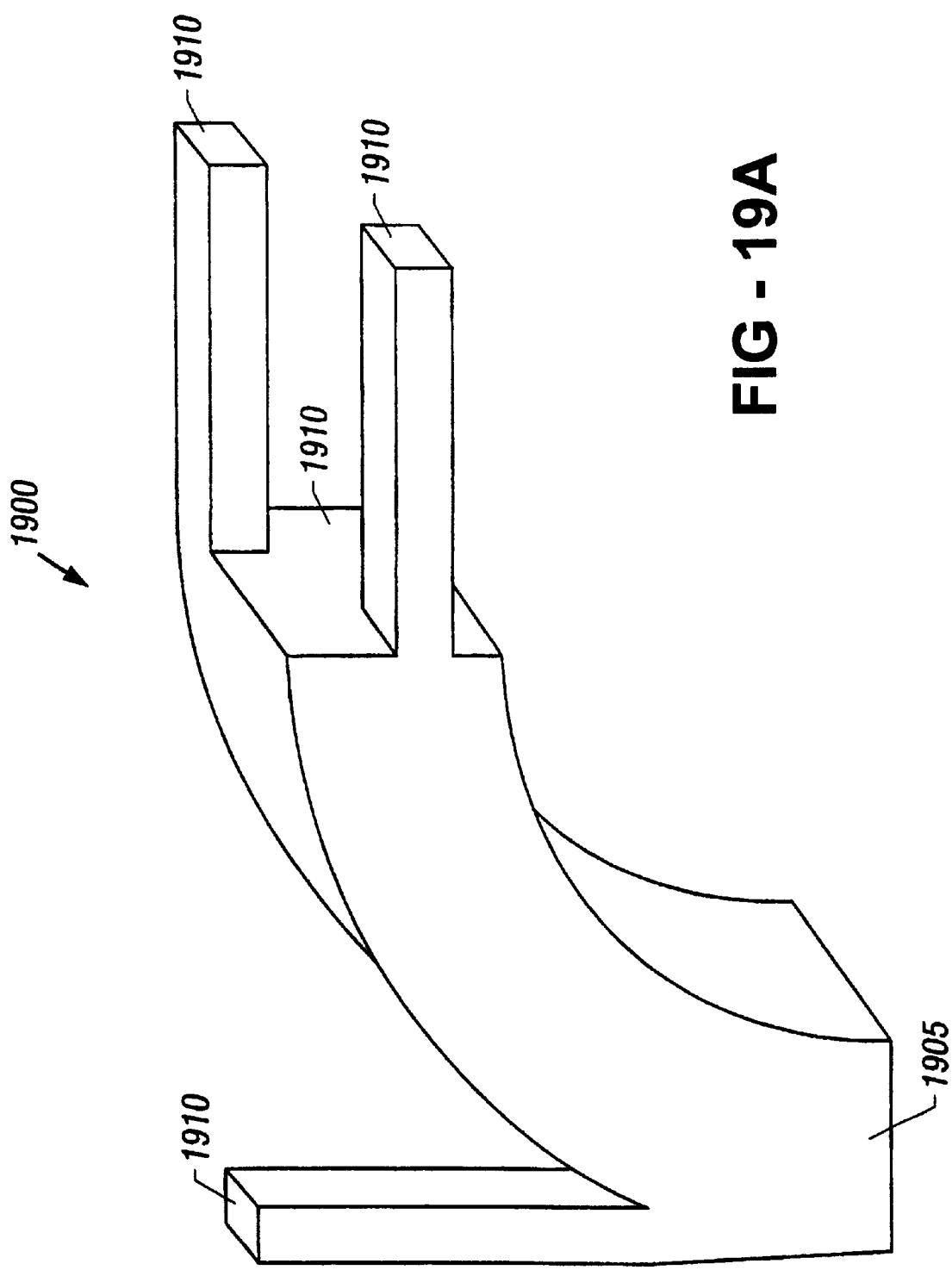
FIGS. 19A and 19B show cross-section views of optical manifolds.
Figure 19B:
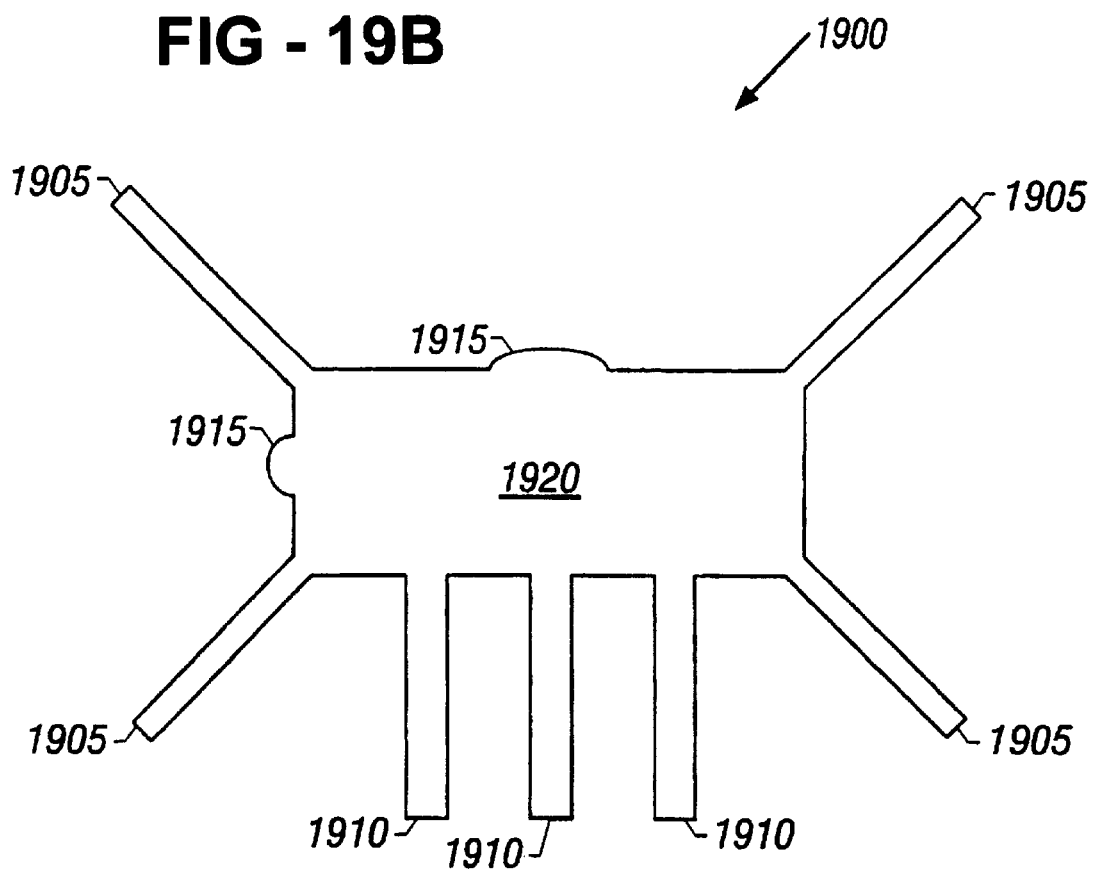

An optical manifold 1900, as shown in FIGS. 19A and 19B, is another useful building block for a DLS. Light enters the optical manifold 1900 through one or more inputs 1905 and is split to one or more of the output arms 1910. Alternatively, light may enter through one or more output arms 1910 and exit through the inputs 1905. The output arms 1910 may branch off at multiple points from the optical manifold in multiple directions to direct light to other subsystems of the DLS in various locations within the vehicle. The size of the output arms 1910 and their locations determines the proportion of the light input to the manifold that is split to each arm.

As shown in FIG. 19B, the optical manifold 1900 may include integrated output elements 1915. The output element 1915 may be lens-like structures that provide lighting functions within the vehicle, such as a reading lights or dashboard lights. The manifold 1900 may have multiple input 1905 and output arms 1910 and a portion 1920 where light from the various inputs is combined. Each input and output may use colored filters to achieve desired lighting effects.

Other embodiments are within the scope of the following claims.

What is claimed is:

1. A distributed lighting system for a vehicle, the distributed lighting system including a hybrid lighting subsystem comprising:

a light source, a lens positioned so that a first portion of light from the light source passes through the lens to provide a first lighting function for the vehicle, wherein the first lighting function is an external lighting function, a collector element positioned to receive a second portion of light from the light source for use in providing a second lighting function, an optical waveguide having a first end positioned to receive light from the collector element and a second end positioned to direct the light for use in providing the second lighting, wherein the first lighting function is a tail light.

2. A distributed lighting system for a vehicle, the distributed lighting system including a hybrid lighting subsystem comprising:

a light source, a lens positioned so that a first portion of light from the light source passes through the lens to provide a first lighting function for the vehicle, a collector element positioned to receive a second portion of light from the light source for use in providing a second lighting function, an optical waveguide having a first end positioned in receive light from the collector element and a second end positioned to direct the light for use in providing the second lighting function, wherein the collector element comprises a piece of solid material having:
   an input face,
   a transmission portion, and
   a focusing portion between the input face and the transmission portion, wherein a cross-sectional area of the focusing portion gradually decreases from the transmission portion to the input face.

3. The distributed lighting system of claim 2, wherein the focusing portion has planar sides angled from a longitudinal axis of the transmission portion.

4. The distributed lighting system of claim 3, wherein an angle formed between the sides and the longitudinal axis is about 5°.

5. The distributed lighting system of claim 2, wherein the focusing portion is configured to increase an acceptance angle of the waveguide.

6. The distributed lighting system of claim 2, further comprising a lens portion formed on the input face.

7. A distributed lighting system for a vehicle, the distributed lighting system including a hybrid lighting subsystem comprising:

a light source, a lens positioned so that a first portion of light from the light source passes through the lens to provide a first lighting function for the vehicle, a collector element positioned to receive a second portion of light from the light source for use in providing a second lighting function, an optical waveguide having a first end positioned to direct the light for use in providing the second lighting function, wherein the second end of the waveguide has an output portion comprising a bend that is configured in change a direction of light from a first direction to a second direction, the second direction being substantially different than the first direction, wherein the bend is configured to change the beam pattern of the emitted light.

8. A distributed lighting system for a vehicle, the distributed lighting system including a hybrid lighting subsystem comprising:

a light source, a lens positioned so that a first portion of light from the light source passes through the lens to provide a first lighting function for the vehicle, a collector element positioned to receive a second portion of light from the light source for use in providing a second lighting function, an optical waveguide having a first end positioned to receive light from the collector element and a second end positioned to direct the light for use in providing the second lighting function, wherein the second end of the waveguide has an output portion comprising a bend that is configured to change a direction of light from a first direction to a second direction, the second direction being substantially different than the first direction, wherein the bend is s-shaped.

9. A distributed lighting system for a vehicle, the system comprising:

a first hybrid lighting subsystem having a lens, a first output waveguide and a first light source, the first subsystem providing a first lighting function for the vehicle, and a second hybrid lighting subsystem having a lens, a second output waveguide and a second light source, the second subsystem providing a second lighting function for the vehicle, wherein the second subsystem is connected to an end of the first output waveguide.

10. A vehicle comprising the distributed lighting system of claim 9.

11. A method for providing vehicle lighting comprising:

producing light in a first subsystem, transmitting a first portion of the light away from the vehicle to provide a first lighting function for the vehicle, wherein the first lighting function comprises a tail light lighting function;

collecting a second portion of the light, and directing the second portion of the light to a second subsystem for use in providing a second lighting function for the vehicle.

12. The method of claim 11, further comprising:

receiving light in the second subsystem from waveguide, and transmitting the received light away from the vehicle to provide the second lighting function.

13. The distributed lighting system of claim 11, wherein the second lighting function is an internal lighting function.

14. The distributed lighting system of claim 11, wherein the second lighting function is an external lighting function.

15. The distributed lighting system of claim 14, wherein the second lighting function is a headlamp.

16. The distributed lighting system of claim 14, wherein the second lighting function is a tail light.

17. The distributed lighting system of claim 14, wherein the second lighting function is turn signal.

18. The distributed lighting system of claim 14, wherein the second lighting function is a side marker.

* * * * *

UNITED STATES PATENT AND TRADEMARK OFFICE
CERTIFICATE OF CORRECTION

PATENT NO. : 6,168,302 B1
DATED : January 2, 2001
INVENTOR(S) : George R. Hulse

It is certified that error appears in the above-identified patent and that said Letters Patent is hereby corrected as shown below:

Title page,
ABSTRACT, line 2, after "A" insert therein -- lens --.
Line 4, after "receives" insert therein -- light --.
Line 6, after "a" insert therein -- first --.

Column 3,
Line 23, delete "provides" and insert therefor -- provide --.
Line 26, delete "electro-mechanical" and insert therefor -- electromechanical --.

Column 4,
Line 36, delete "a" and insert therefor -- an --.

Column 6,
Line 7, delete "Length" and insert therefor -- length --.
Line 54, after "as" delete "a".

Column 8,
Line 27, after "mm" insert therein -- [inches] --.

Column 10,
Line 46, after "mm" insert therein -- [inches] --.
Line 54, delete "a" and insert therefor -- an --.

Column 11,
Line 44, delete "1E" and insert therefor -- 11E --.
Line 52, after "narrower" insert therein -- ) --.

Column 14,
Line 63, after "lighting" insert therein -- function --.

Column 15,
Line 45, delete "direct" and insert therefor -- receive --.
Line 48, delete "in" and insert therefor -- to --.

UNITED STATES PATENT AND TRADEMARK OFFICE
CERTIFICATE OF CORRECTION

PATENT NO.    : 6,168,302 B1
DATED         : January 2, 2001
INVENTOR(S)   : George R. Hulse It is certified that error appears in the above-identified patent and that said Letters Patent is hereby corrected as shown below:

Column 16,
Line 43, after "from" insert therein --a --.
Line 57, after "is" insert therein -- a--.

Signed and Sealed this

Fourteenth Day of May, 2002

Attest:

JAMES E. ROGAN
*Attesting Officer*   *Director of the United States Patent and Trademark Office*